US009438639B2

United States Patent
Satomi et al.

(10) Patent No.: US 9,438,639 B2
(45) Date of Patent: Sep. 6, 2016

(54) NETWORK SYSTEM, ACCESS-SUPPORT SERVER, PROCESSING DEVICE, AND COMMUNICATION AGENT DEVICE

(71) Applicant: Konica Minolta, Inc., Chiyoda-ku (JP)

(72) Inventors: Shinya Satomi, Suita (JP); Masato Fujii, Nagaokakyo (JP); Kouichi Tomita, Kawanishi (JP); Kei Nakahara, Suita (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 161 days.

(21) Appl. No.: 14/250,422

(22) Filed: Apr. 11, 2014

(65) Prior Publication Data

US 2014/0324949 A1    Oct. 30, 2014

(30) Foreign Application Priority Data

Apr. 26, 2013    (JP) .................................. 2013-093239

(51) Int. Cl.
 *G06F 15/16*        (2006.01)
 *H04L 29/06*        (2006.01)
 *H04L 29/08*        (2006.01)

(52) U.S. Cl.
 CPC ......... *H04L 65/1069* (2013.01); *H04L 63/029* (2013.01); *H04L 63/0823* (2013.01); *H04L 67/16* (2013.01)

(58) Field of Classification Search
 CPC . H04L 63/029; H04L 67/16; H04L 63/0823; H04L 65/1069
 See application file for complete search history.

(56) References Cited

U.S. PATENT DOCUMENTS 6,557,037 B1 *   4/2003   Provino .................. H04L 29/06
                                                                709/225
6,859,527 B1     2/2005   Banks et al.
(Continued)

FOREIGN PATENT DOCUMENTS

JP    2002-082792 A    3/2002
JP    2003-101590      4/2003
(Continued)

OTHER PUBLICATIONS

Notification of Reasons for Refusal issued in corresponding Japanese Patent Application No. 2013-093239, mailed Mar. 17, 2015, and English translation thereof.

(Continued)

*Primary Examiner* — Mohamed Wasel
(74) *Attorney, Agent, or Firm* — Buchanan Ingersoll & Rooney PC

(57) ABSTRACT

A network system includes a first device for performing specific processing; a second device for causing the first device to perform the specific processing; and a server for supporting the second device in having access to the first device. The first device includes a first session establishing portion which has access to the server and to establish a first session between the first device and the server. The second device includes an address information transmission portion which sends address information indicating an address of the second device to the server, and a transfer portion which transfers the address information through the first session to the first device. The first device further includes a second session establishing portion which has access to the second device based on the address information and to establish a second session between the first device and the second device.

14 Claims, 28 Drawing Sheets

(56) References Cited

U.S. PATENT DOCUMENTS

| | | | |
|---|---|---|---|
| 2001/0055125 A1 | 12/2001 | Yamada et al. | |
| 2006/0130122 A1 | 6/2006 | Konno | |
| 2006/0155984 A1 | 7/2006 | Tsuchida et al. | |
| 2009/0051962 A1* | 2/2009 | Asai | G06F 3/1205 358/1.15 |
| 2009/0287837 A1* | 11/2009 | Felsher | G06F 19/322 709/229 |
| 2013/0003106 A1 | 1/2013 | Nishida et al. | |
| 2013/0258402 A1* | 10/2013 | Arai | H04N 1/00344 358/1.15 |
| 2014/0005809 A1* | 1/2014 | Frei | H04L 29/1249 700/90 |
| 2014/0208132 A1* | 7/2014 | Cheston | G06F 1/26 713/310 |
| 2014/0268236 A1* | 9/2014 | Ohara | G06F 3/1224 358/1.15 |
| 2015/0023155 A1* | 1/2015 | Shanmugavadivel | H04L 45/28 370/225 |
| 2015/0277820 A1* | 10/2015 | Anezaki | G06F 3/1236 358/1.15 |
| 2015/0301765 A1* | 10/2015 | Nishiyama | G06F 3/1203 358/1.15 |

FOREIGN PATENT DOCUMENTS

| | | |
|---|---|---|
| JP | 2006-501755 | 1/2006 |
| JP | 2013-033437 A | 2/2013 |

OTHER PUBLICATIONS

Extended European Search Report issued on Sep. 23, 2014, by the European Patent Office in corresponding European Patent Application No. 14161965.0-1853. (5 pages).

* cited by examiner

| DEVICE IDENTIFIER (DEVICE ID) | ACCOUNT CODE | DEVICE NAME |
|---|---|---|
| device_0001 | gateway_a001 | ABC-123std |
| device_0002 | gateway_b001 | ABC-123pro |
| device_0003 | gateway_c001 | ABC-222 |
| device_0004 | gateway_d001 | XZY-999 |
| ⋮ | ⋮ | ⋮ |

6A — DEVICE IDENTIFIER (DEVICE ID)
6B — ACCOUNT CODE
6C — DEVICE NAME

| DEVICE IDENTIFIER (DEVICE ID) | ACCOUNT CODE | DEVICE NAME | STATUS INFORMATION |
|---|---|---|---|
| device_0001 | gateway_a001 | ABC-123std | ACTIVE |
| device_0002 | gateway_b001 | ABC-123pro | ACTIVE |
| device_0003 | gateway_c001 | ABC-222 | NON-ACTIVE |
| device_0004 | gateway_d001 | XZY-999 | ACTIVE |
| ⋮ | ⋮ | ⋮ | ⋮ |

| DEVICE IDENTIFIER (DEVICE ID) 6A | SESSION COUNT 6Q |
|---|---|
| device_0001 | 3 |
| device_0002 | 2 |
| device_0003 | 0 |
| device_0004 | 4 |
| ⋮ | ⋮ |

| DEVICE IDENTIFIER (DEVICE ID) | ACCOUNT CODE | DEVICE NAME |
|---|---|---|
| device_0001 | gateway_a001 | ABC-123std |
| device_0002 | gateway_b001 | ABC-123pro |
| device_0003 | gateway_c001 | ABC-222 |
| device_0004 | gateway_d001 | XZY-999 |
| ⋮ | ⋮ | ⋮ |

6A, 6B, 6C

NETWORK SYSTEM, ACCESS-SUPPORT SERVER, PROCESSING DEVICE, AND COMMUNICATION AGENT DEVICE

This application is based on Japanese patent application No. 2013-093239 filed on Apr. 26, 2013, the contents of which are hereby incorporated by reference.

BACKGROUND OF THE INVENTION

1. Field of the Invention

The present invention relates to a technology for communication between two devices located in different networks.

2. Description of the Related Art

Recent years have seen the widespread use of a technology by which two devices located in different networks operate in cooperation with each other to provide users with service.

For example, a technology comes into widespread use in which a personal computer located in a corporate Local Area Network (LAN) and a web server located in an Application Service Provider (ASP) network cooperate with each other to deliver information such as news via the Internet.

In general, the LAN is provided with a firewall. Such a firewall is so set that access from an external device to a device in the LAN is restricted more tightly than access from a device in the LAN to an external device.

In order for a user to obtain information from a web server, he/she needs to have access to the web server from a personal computer of the LAN to establish a session. In usual settings for a firewall, access from a web server to a personal computer of the LAN is prohibited in many cases.

To cope with this, the following method has been proposed. A managed device, a managing device for managing the managed device, and a relay server are connected to the Internet. The managed device has access to the relay server to obtain from the server first transfer information to be transferred to the managed device, or, sends to the relay server second transfer information to be transferred to the managing device. The managing device has access to the relay server to obtain the second transfer information from the relay server, or, to send the first transfer information to the relay server (Japanese Laid-open Patent Publication No. 2002-082792). Stated differently, both the managed device and the managing device save information to be sent to the other end of communication to the relay server. Then, each of the managed device and the managing device has access to the relay server to download therefrom information that has been sent to the device itself.

The method described in Japanese Laid-open Patent Publication No. 2002-082792 enables communication between the managed device and the managing device independently of a firewall.

However, data sent and received between the managed device and the managing device always pass through the relay server. Therefore, increase in communication puts more loads onto the relay server.

The present invention has been achieved in light of such an issue, and an object thereof is to perform communication via a firewall with loads put onto a relay server reduced as compared with conventional methods.

SUMMARY

According to one aspect of the present invention, a network system includes a first device configured to perform specific processing; a second device configured to cause the first device to perform the specific processing; and a server configured to support the second device in having access to the first device. The first device includes a first session establishing portion configured to have access to the server and to establish a first session between the first device and the server, the second device includes an address information transmission portion configured to send, to the server, address information indicating an address of the second device, the server includes a transfer portion configured to transfer the address information through the first session to the first device, and the first device further includes a second session establishing portion configured to have access to the second device based on the address information and to establish a second session between the first device and the second device.

These and other characteristics and objects of the present invention will become more apparent by the following descriptions of preferred embodiments with reference to drawings.

BRIEF DESCRIPTION OF THE DRAWINGS

FIG. 6 is a diagram showing an example of a device management table.

FIG. 14 is a diagram showing an example of a device management table.

FIG. 22 is a diagram showing an example of a communication session table.

FIG. 26 is a diagram showing an example of a device management table.

DESCRIPTION OF THE PREFERRED EMBODIMENTS

First Embodiment

Figure 1:
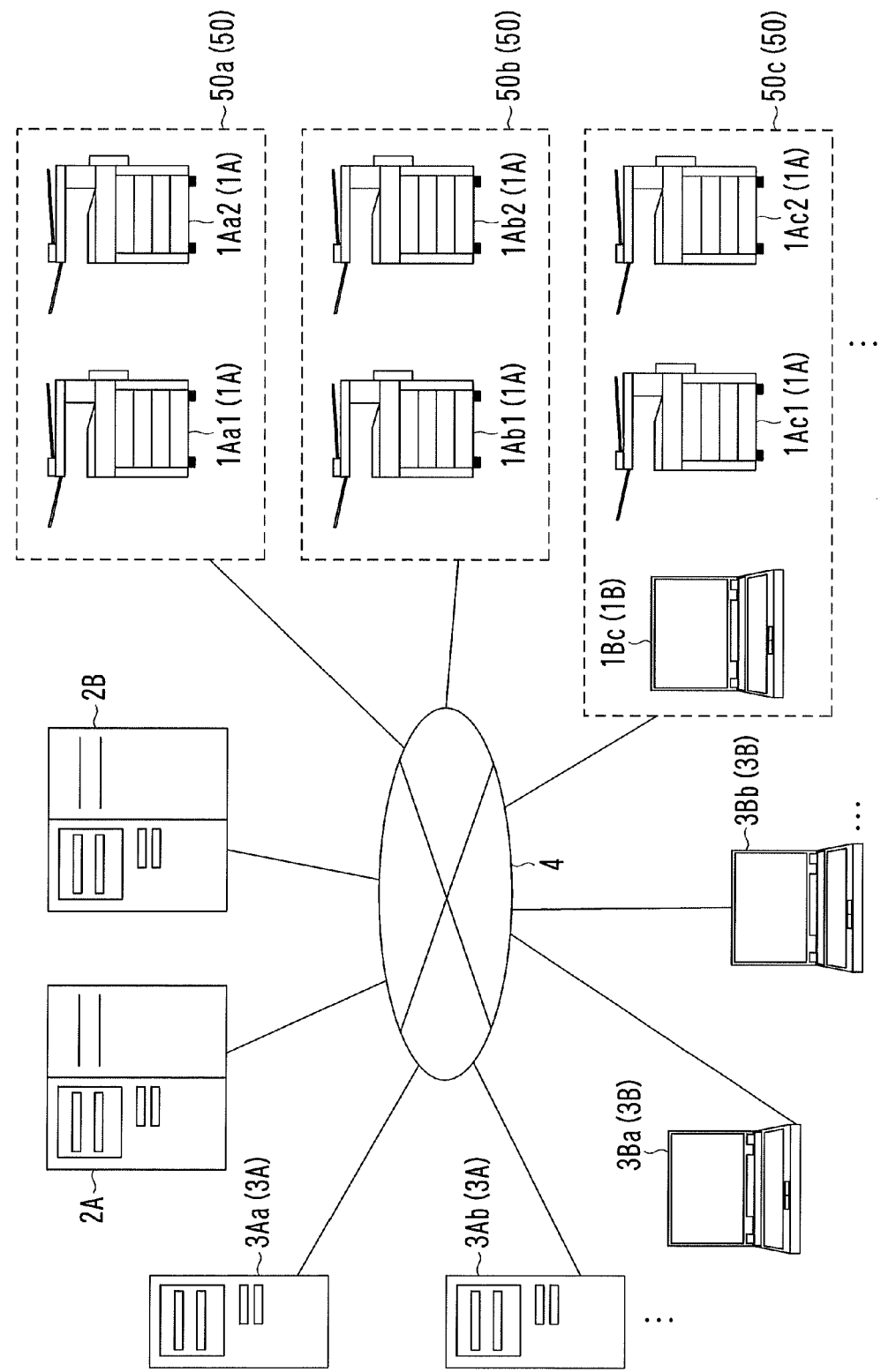
FIG. 1 is a diagram showing an example of the overall configuration of an application system.
Figure 2:
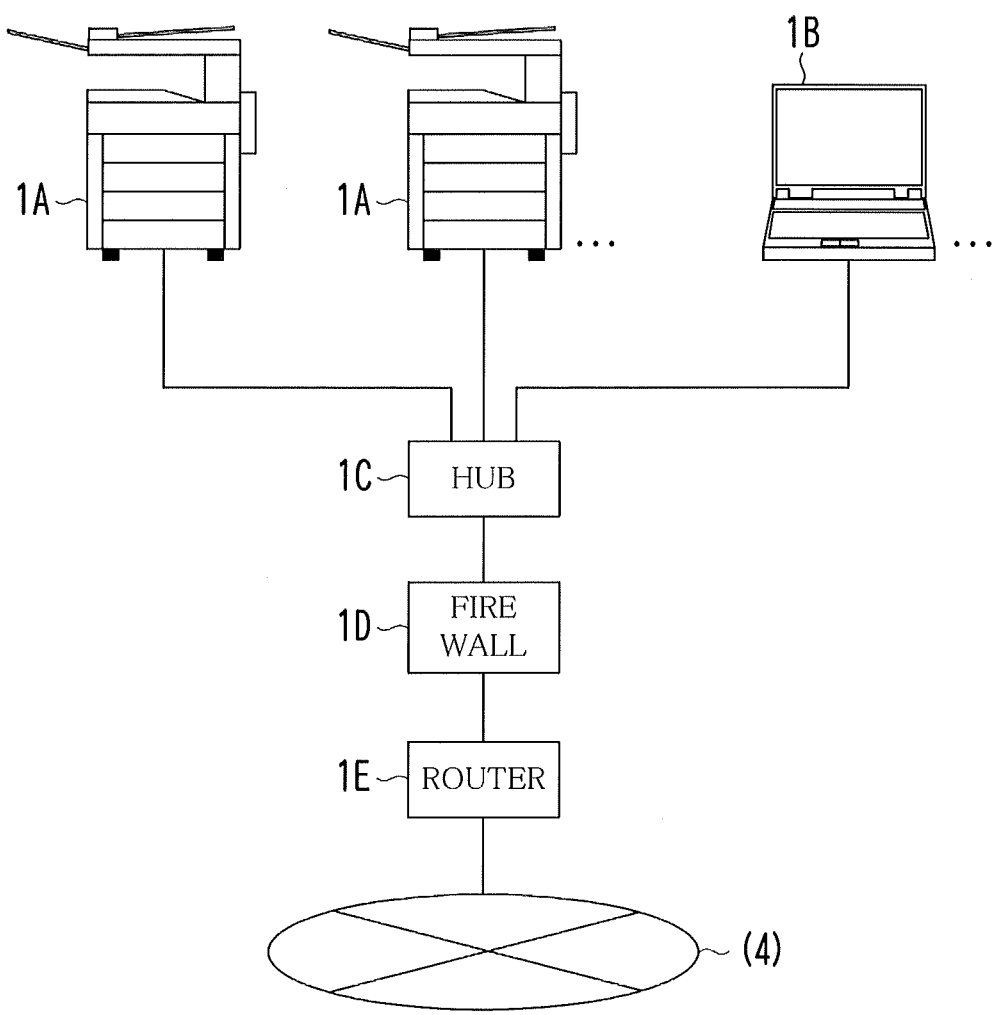
FIG. 2 is a diagram showing an example of the over all configuration of a LAN.
Figure 3:
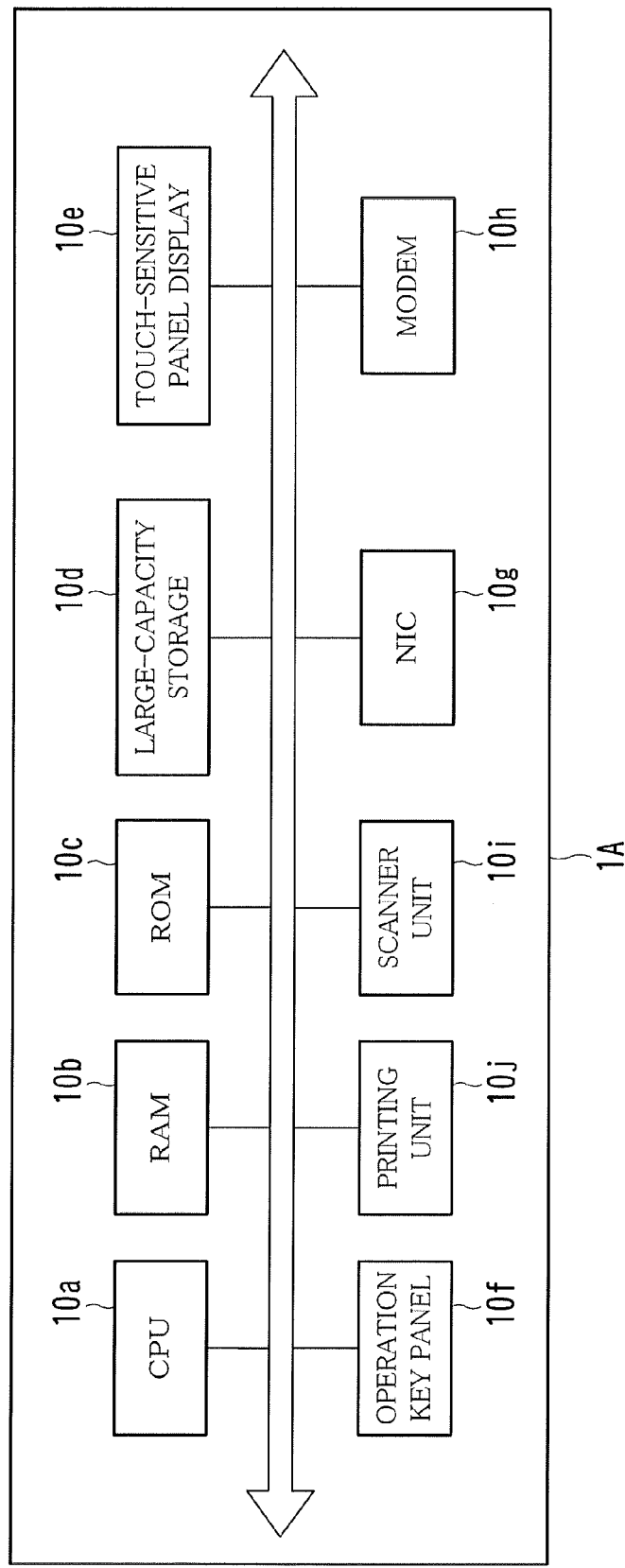
FIG. 3 is a diagram showing an example of the hardware configuration of an image forming apparatus.
Figure 4:
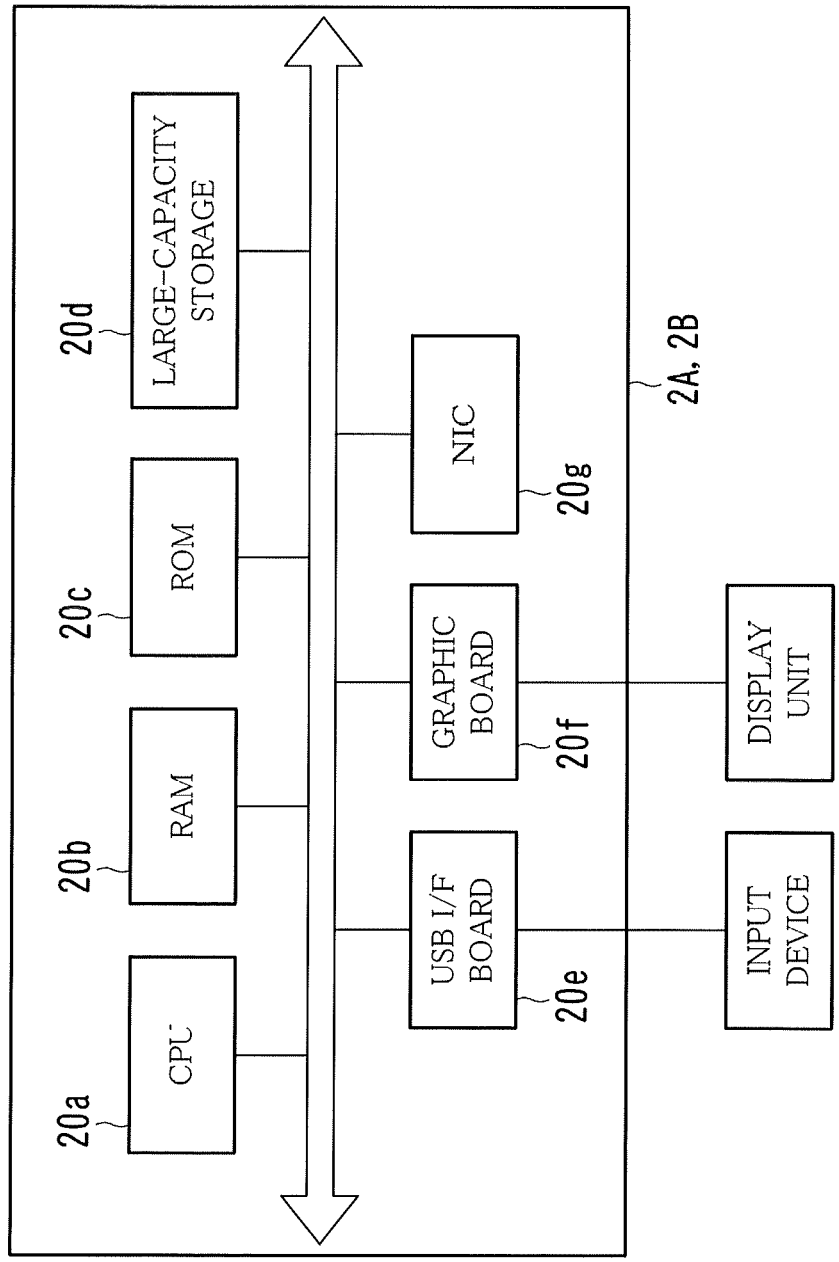
FIG. 4 is a diagram showing an example of the hardware configuration of a device managing server and a full-time connection server.
Figure 5:
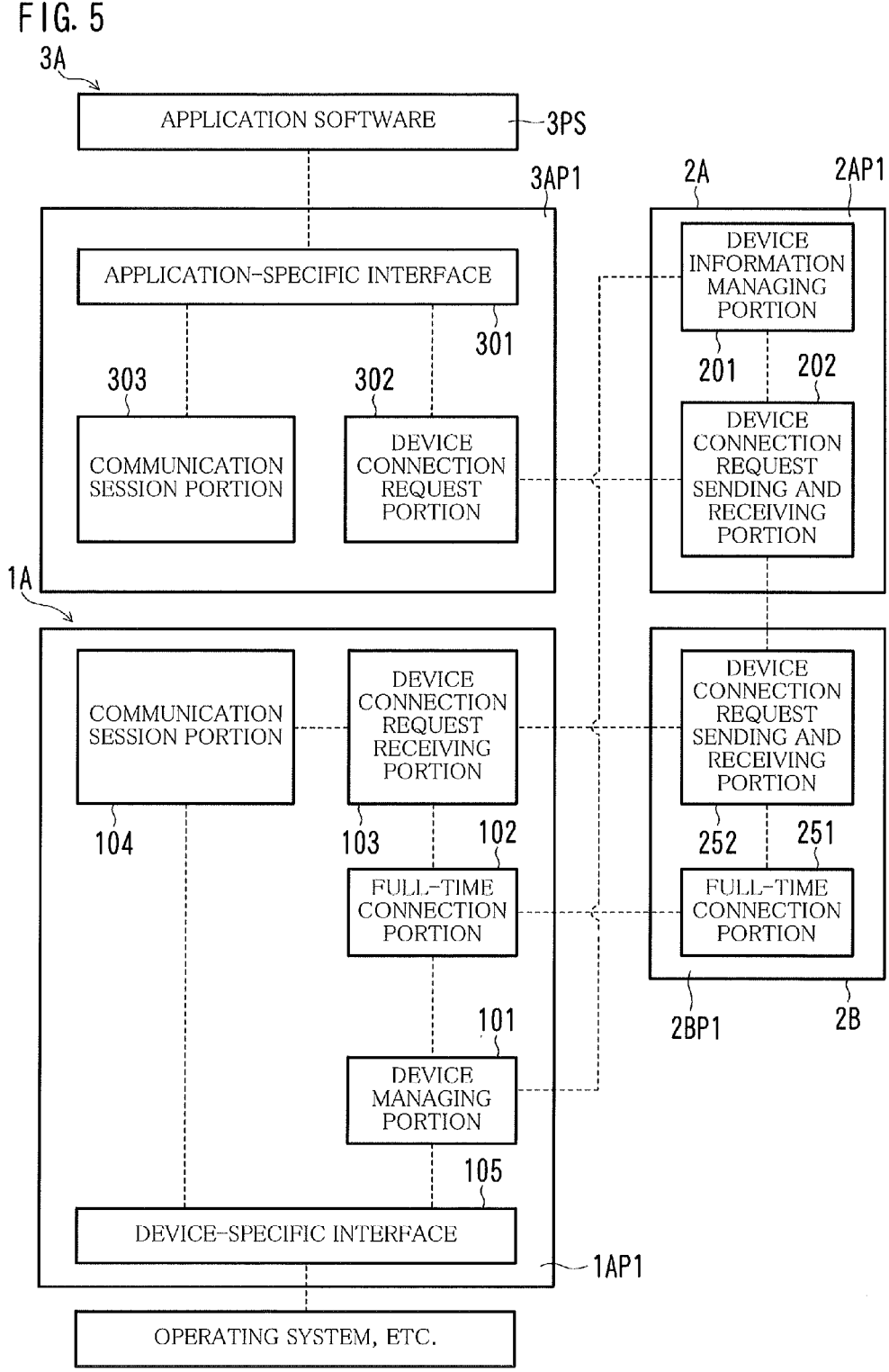
FIG. 5 is a diagram showing an example of the functional configuration of each device of an application system.

FIG. 1 is a diagram showing an example of the overall configuration of an application system 5. FIG. 2 is a diagram showing an example of the overall configuration of a LAN 50. FIG. 3 is a diagram showing an example of the hardware configuration of an image forming apparatus 1A. FIG. 4 is a diagram showing an example of the hardware configuration of a device managing server 2A and a full-time connection server 2B. FIG. 5 is a diagram showing an example of the functional configuration of each device of the application system 5.

Referring to FIG. 1, the application system 5 is configured of at least one Local Area Network (LAN) 50, the device managing server 2A, the full-time connection server 2B, at least one application server 3A, at least one terminal 3B, a communication line 4, and so on. In the application system 5, the devices work in conjunction with one another for a variety of application processes.

Hereinafter, the LANs 50 are sometimes referred to as a "LAN 50a", "LAN 50b", . . . , and so on to distinguish one from another. Likewise, the application servers 3A are sometimes referred to as an "application server 3Aa", "application server 3Ab", . . . , and so on to distinguish one from another. Further, the terminals 3B are sometimes referred to as a "terminal 3Ba", "terminal 3Bb", . . . , and so on to distinguish one from another.

The devices of the LAN 50, the device managing server 2A, the full-time connection server 2B, the application server 3A, and the terminal 3B are capable of performing communication through the communication line 4. Examples of the communication line 4 are the Internet, a dedicated line, and a public line.

Referring to FIG. 2, the LAN 50 is configured of at least one image forming apparatus 1A, at least one terminal 1B, a hub 1C, a firewall 1D, a router 1E, and so on.

The image forming apparatus 1A is an image processing apparatus that is generally called a "Multi-Functional Peripheral (MFP)" or a "multifunction device". The image forming apparatus 1A is an apparatus into which functions such as copying, PC printing, faxing, scanning, and box function are consolidated.

The PC printing function is to print an image onto paper based on image data received from the terminal 1B.

According to the box function, a storage area called a "box" or "personal box" is allocated to each user. The box function enables each user to save image data and so on to his/her storage area and to manage the same therein. The box corresponds to a "folder" or "directory" in a personal computer.

Referring to FIG. 3, the image forming apparatus 1A is configured of a Central Processing Unit (CPU) 10a, a Random Access Memory (RAM) 10b, a Read Only Memory (ROM) 10c, a large-capacity storage 10d, a touch-sensitive panel display 10e, an operation key panel 10f, a Network Interface Card (NIC) 10g, a modem 10h, a scanner unit 10i, a printing unit 10j, and so on.

The touch-sensitive panel display 10e displays, for example, a screen for presenting messages to a user, a screen for allowing a user to input commands or information, a screen for showing the results of processing executed by the CPU 10a and so on. The touch-sensitive panel display 10e sends a signal indicating a touched position to the CPU 10a.

The operation key panel 10f is a so-called hardware keyboard, and is provided with a numeric keypad, a start key, a stop key, and a function key.

The NIC 10g performs communication with other devices in accordance with a protocol such as Transmission Control Protocol/Internet Protocol (TCP/IP) or an upper protocol. Examples of the upper protocol are Hypertext Transfer Protocol (HTTP), HTTP over transport layer Security (HTTPS), eXtensible Messaging and Presence Protocol (XMPP), and Simple Network Management Protocol (SNMP).

The modem 10h sends and receives image data with a facsimile terminal in accordance with a protocol such as G3.

The scanner unit 10i optically reads an image recorded on a sheet of paper placed on a platen glass, and generates image data thereof.

The printing unit 10j prints, onto paper, an image captured by the scanner unit 10i and an image received from other devices.

The ROM 10c or the large-capacity storage 10d stores, therein, software for implementing the foregoing functions such as copying. Each of the image forming apparatuses 1A, at least, of the LAN 50A has a gateway program 1AP1 (see FIG. 5) stored therein. The gateway program 1AP1 is a program which enables a device provided outside the LAN 50 to have access to the image forming apparatus 1A. The gateway program 1AP1 implements a gateway portion. The mechanism thereof is described later. The gateway program 1AP1 is loaded into the RAM 10b, and executed by the CPU 10a. The large-capacity storage 10d is, for example, a hard disk drive or a Solid State Drive (SSD).

Hereinafter, the image forming apparatuses 1A are sometimes referred to as an "image forming apparatus 1Aa1", "image forming apparatus 1Aa2", "image forming apparatus 1Ab1", "image forming apparatus 1Ab2", . . . , and so on to distinguish one from another, as shown in FIG. 1.

The terminal 1B (refer to FIG. 2) is a device for a user to remotely use the foregoing functions of the image forming apparatus 1A. In short, the terminal 1B is a client of the image forming apparatus 1A. The user is also capable of using the functions of the image forming apparatus 1A through operation on a device external to the LAN 50. The mechanism thereof is described later. Examples of the terminal 1B are a personal computer, a tablet computer, and a smartphone.

The router 1E is operable to connect the LAN 50 to another network such as the Internet.

The firewall 1D is provided between the hub 1C and the router 1E. The firewall 1D is operable to monitor communication performed by the devices of the LAN 50, and prevent attacks from outside the LAN 50 and unauthorized access. In particular, in this embodiment, the firewall 1D severely restricts access from outside the LAN 50. In some cases, the functions of the firewall 1D are equipped in the router 1E.

The image forming apparatus 1A, the terminal 1B, and the firewall 1D are connected to the hub 1C.

The configuration discussed above makes it possible to perform communication between the devices of the LAN 50, and also to perform communication between the devices of the LAN 50 and a device external thereto under certain restrictions. The LAN 50 may be a Virtual Private Network (VPN).

Referring back to FIG. 1, the device managing server 2A and the full-time connection server 2B both mediate access from a device external to the LAN 50 to the image forming apparatus 1A.

In particular, the device managing server 2A manages information on each of the image forming apparatuses 1A of each of the LANs 50. The full-time connection server 2B is capable of keeping connection with the image forming apparatus 1A.

As shown in FIG. 4, each of the device managing server 2A and the full-time connection server 2B is configured of a CPU 20$a$, a RAM 20$b$, a ROM 20$c$, a large-capacity storage 20$d$, a USB interface board 20$e$, a graphic board 20$f$, an NIC 20$g$, and so on.

The USB interface board 20$e$ is a user interface to connect an input device such as a keyboard or a pointing device to the device managing server 2A or the full-time connection server 2B.

The graphic board 20$f$ generates an image signal and outputs the image signal to the display unit. Thereby, an image is displayed on the display unit.

The NIC 20$g$ performs communication with another device in accordance with a protocol such as TCP/IP.

The ROM 20$c$ or the large-capacity storage 20$d$ stores, therein, a program for implementing the foregoing functions. The program is loaded into the RAM 20$b$, and is executed by the CPU 20$a$. In particular, the ROM 20$c$ or the large-capacity storage 20$d$ of the device managing server 2A stores, therein, a device management program 2AP1 (see FIG. 5). The ROM 20$c$ or the large-capacity storage 20$d$ of the full-time connection server 2B stores, therein, a full-time connection program 2BP1.

Referring back to FIG. 1, the application server 3A applies the functions of the image forming apparatus 1A to provide a variety of service. For example, the application server 3A causes the image forming apparatus 1A to print a document created by a user. The application server 3A also causes the terminal 3B to display an address book registered in the image forming apparatus 1A.

The hardware configuration of the application server 3A is basically the same as that of each of the device managing server 2A and the full-time connection server 2B. However, a ROM or a large-capacity storage of the application server 3A stores, therein, application software 3PS (see FIG. 5) for the service. The ROM or the large-capacity storage of the application server 3A also stores, therein, an access program 3AP1 for access to the image forming apparatus 1A. These programs are loaded into the RAM and are executed by the CPU.

The terminal 3B is a device for the user to be given the foregoing service provided by the application server 3A and the image forming apparatus 1A. Stated differently, the terminal 3B is a client of the application server 3A and the image forming apparatus 1A. Examples of the terminal 3B are a personal computer, a tablet computer, and a smartphone.

The description goes onto a mechanism according to which the application server 3A has access to the image forming apparatus 1A, and the application server 3A and the image forming apparatus 1A work in conjunction with each other to provide service to a user.

The foregoing programs of the devices implement the functions shown in FIG. 5. The gateway program 1AP1 implements the functions of a device managing portion 101, a full-time connection portion 102, a device connection request receiving portion 103, a communication session portion 104, a device-specific interface 105, and so on.

The device management program 2AP1 implements the functions of a device information managing portion 201 and a device connection request sending and receiving portion 202.

The full-time connection program 2BP1 implements the functions of a full-time connection portion 251 and a device connection request sending and receiving portion 252.

The access program 3AP1 implements the functions of an application-specific interface 301, a device connection request portion 302, and a communication session portion 303.

Hereinafter, processing by the individual portions shall be described, the description being broadly divided into setup processing and processing for providing an external user with service.

[Setup Processing]

Figure 7:
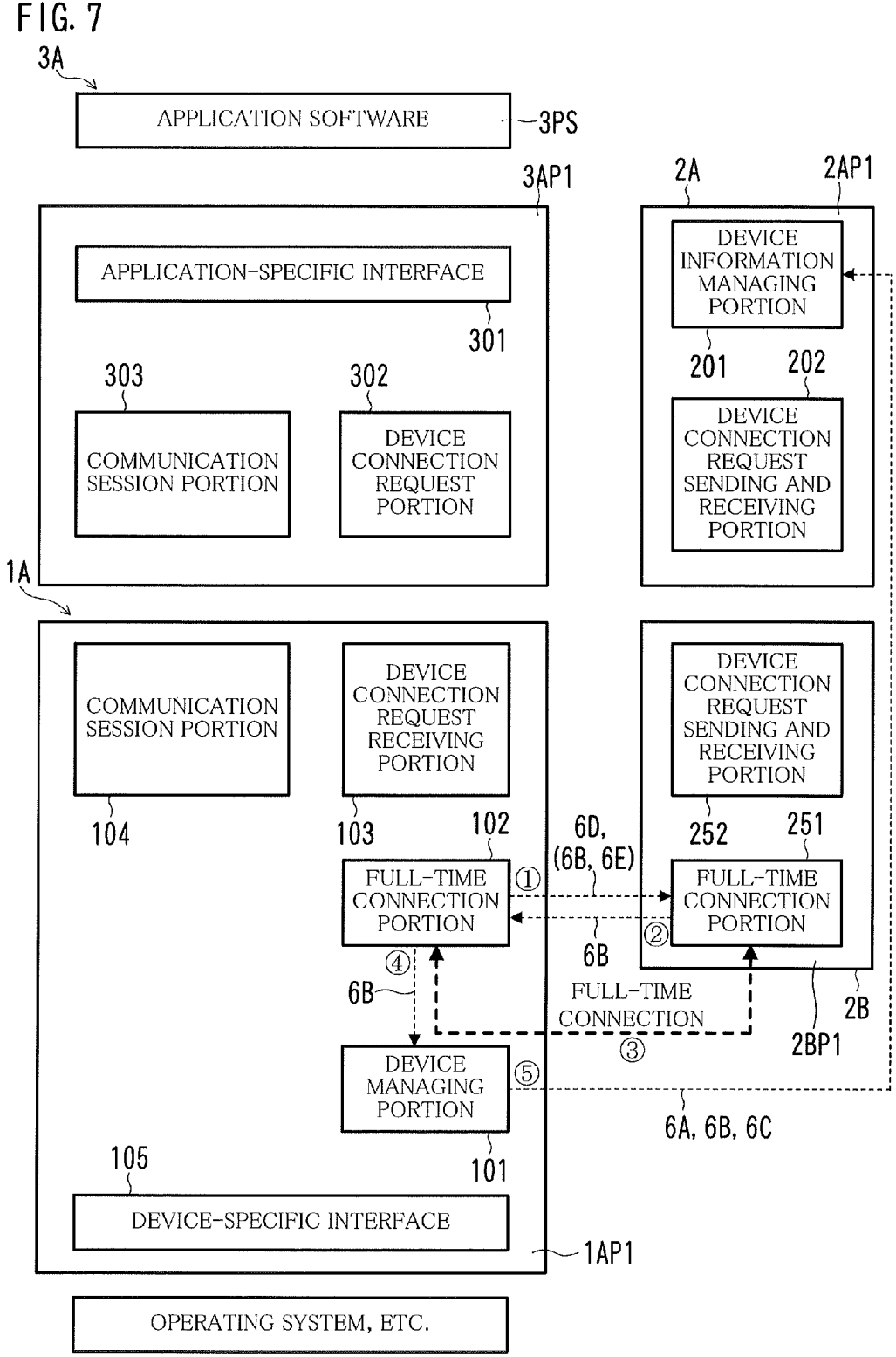
FIG. 7 is a diagram showing an example as to how information is conveyed for a setup.
Figure 8:
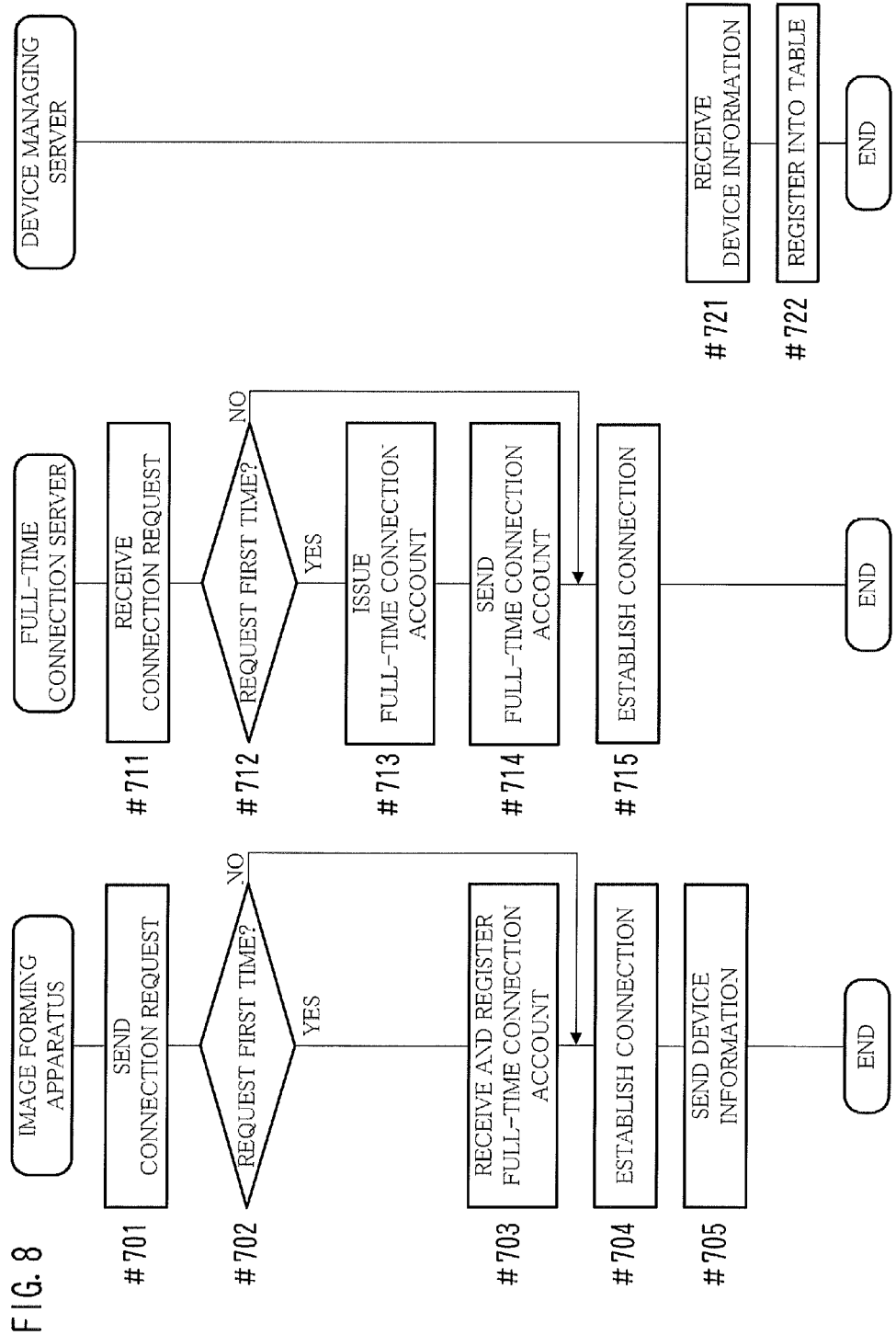
FIG. 8 is a flowchart depicting an example of the flow of setup processing.

FIG. 6 is a diagram showing an example of a device management table 2TL1. FIG. 7 is a diagram showing an example as to how information is conveyed for a setup. FIG. 8 is a flowchart depicting an example of the flow of setup processing.

The device information managing portion 201 of the device managing server 2A stores and manages the device management table 2TL1 as shown in FIG. 6. The device management table 2TL1 has records showing a device identifier 6A, an account code 6B, and a device name 6C for each of the image forming apparatuses 1A connected to the full-time connection server 2B. The device identifier 6A is identification (ID) for identifying the corresponding image forming apparatus 1A. The device name 6C is a product name or model number of the corresponding image forming apparatus 1A. The account code 6B is described later.

The device managing portion 101 of the image forming apparatus 1A stores and manages the device identifier 6A and the device name 6C of the subject image forming apparatus 1A.

In order that a device external to the LAN 50 has access to the image forming apparatus 1A, it is necessary that the subject image forming apparatus 1A is connected to the full-time connection server 2B and a record for the subject image forming apparatus 1A is registered in the device management table 2TL1.

The description goes on to the connection and registration processing on the image forming apparatus 1Aa1 with reference to FIGS. 7 and 8.

The full-time connection portion 102 of the image forming apparatus 1Aa1 sends a full-time connection request 6D to the full-time connection server 2B at a predetermined time, e.g., at a time when the image forming apparatus 1Aa1 is turned ON and the operating system starts (encircled number 1 of FIG. 7, and Step #701 of FIG. 8). A connection request is thereby made to the full-time connection server 2B.

When receiving the full-time connection request 6D (Step #711), the full-time connection portion 251 of the full-time connection server 2B newly issues an account necessary for the image forming apparatus 1Aa1 to be continuously connected to the full-time connection server 2B (Step #713), provided that the full-time connection portion 251 has received the full-time connection request 6D from the image forming apparatus 1Aa1 for the first time (Yes in Step #712). Hereinafter, the account is referred to as a "full-time connection account". The full-time connection account is given an account code 6B for distinguishing the full-time connection account from other full-time connection accounts, and a password 6E for authentication. The full-time connection portion 251 sends the account code 6B and the password 6E to the image forming apparatus 1Aa1 (encircled number 2, and Step #714).

When the image forming apparatus 1Aa1 has already had a full-time connection account, the full-time connection portion 102 sends the account code 6B and the password 6E together with the full-time connection request 6D to the full-time connection server 2B in Step #701.

Strictly speaking, the full-time connection account is issued for each gateway portion. The gateway portion is provided in the image forming apparatus 1A having the gateway program 1AP1 installed thereon. The image forming apparatus 1Aa1 therefore has the gateway portion. The image forming apparatus 1A onto which the gateway program 1AP1 is not installed is described later.

The full-time connection portion 251 uses the account code 6B and the password 6E which are received from the image forming apparatus 1Aa1 or are newly issued thereto to establish a session (connection) between the full-time connection server 2B and the image forming apparatus 1Aa1 (encircled number 3, Steps #715 and #704). Thereby, tunneling is completed. The session is preferably established by a known method. The password 6E may be used for verification as to the identity of the image forming apparatus 1Aa1. The connection is maintained in principle. Stated differently, the connection is so-called full-time connection.

When the image forming apparatus 1Aa1 has connected to the full-time connection server 2B for the first time (Yes in Step #702), the full-time connection portion 102 stores the account code 6B and the password 6E received from the full-time connection server 2B into the device managing portion 101 (encircled number 4, and Step #703).

The full-time connection portion 102 then sends, as the device information, the device identifier 6A, the account code 6B, and the device name 6C to the device managing server 2A (encircled number 5, and Step #705). The device identifier 6A, the account code 6B, and the device name 6C are received/sent through a tunnel, i.e., encapsulated in accordance with a protocol of the tunnel and received/sent.

When receiving the device identifier 6A, the account code 6B, and the device name 6C from the image forming apparatus 1Aa1 (Step #721), the device information managing portion 201 of the device managing server 2A registers, as one record, the device identifier 6A, the account code 6B, and the device name 6C into the device management table 2TL1 (see FIG. 6) (Step #722).

When the session between the image forming apparatus 1Aa1 and the full-time connection server 2B is disconnected, the full-time connection server 2B informs the device managing server 2A accordingly. The device information managing portion 201 may delete the record of the image forming apparatus 1Aa1 from the device management table 2TL1.

The device-specific interface 105 is an interface for the operating system of the image forming apparatus 1A or for the application software 3PS. The full-time connection portion 102 may obtain the device identifier 6A and the device name 6C from the operating system through the device-specific interface 105.

[Processing for Providing an External User with Service]

Figure 9:
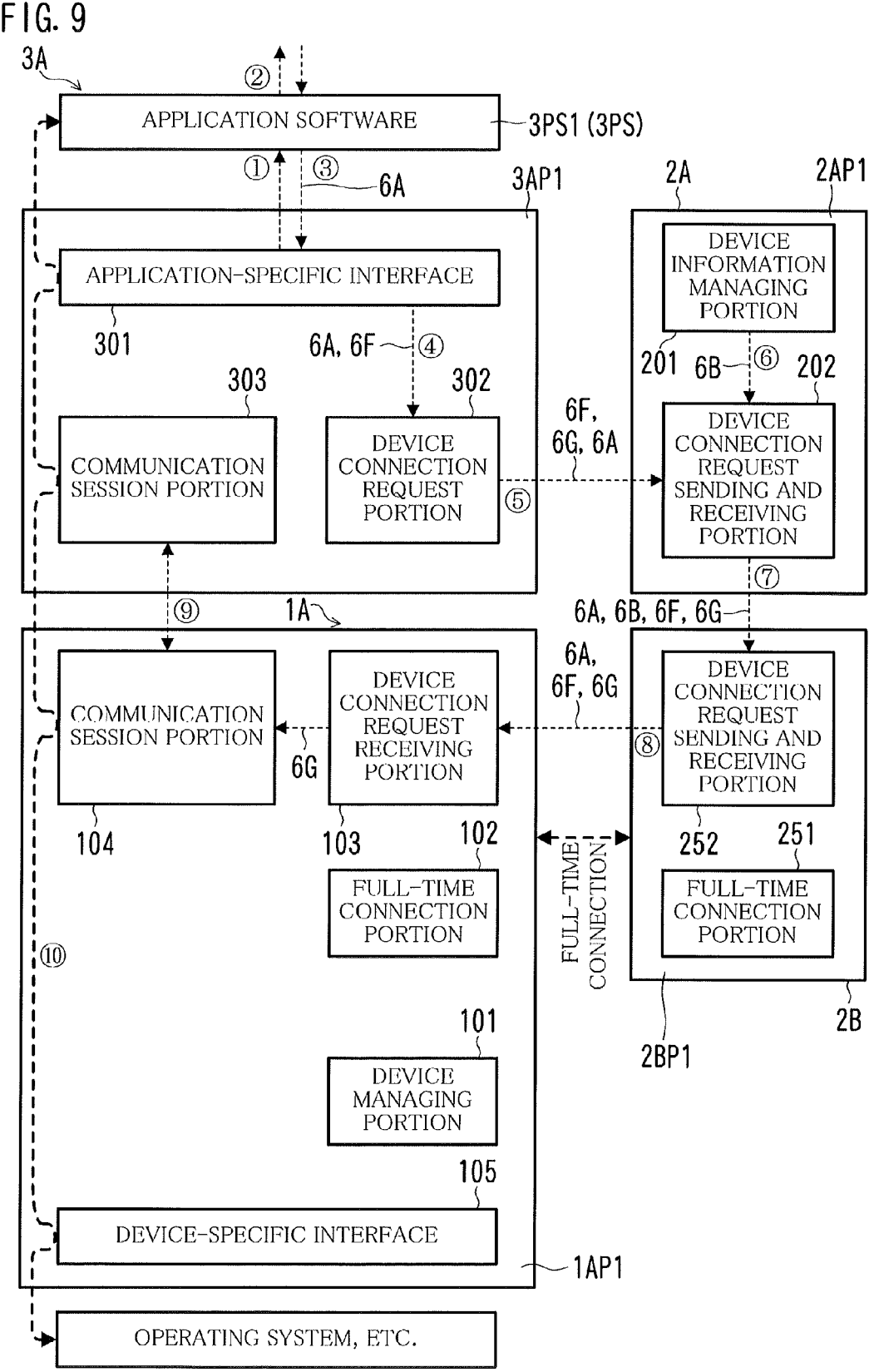
FIG. 9 is a diagram showing an example as to how information is conveyed for a case where an application server and an image forming apparatus work in coordination with each other.
Figure 10:
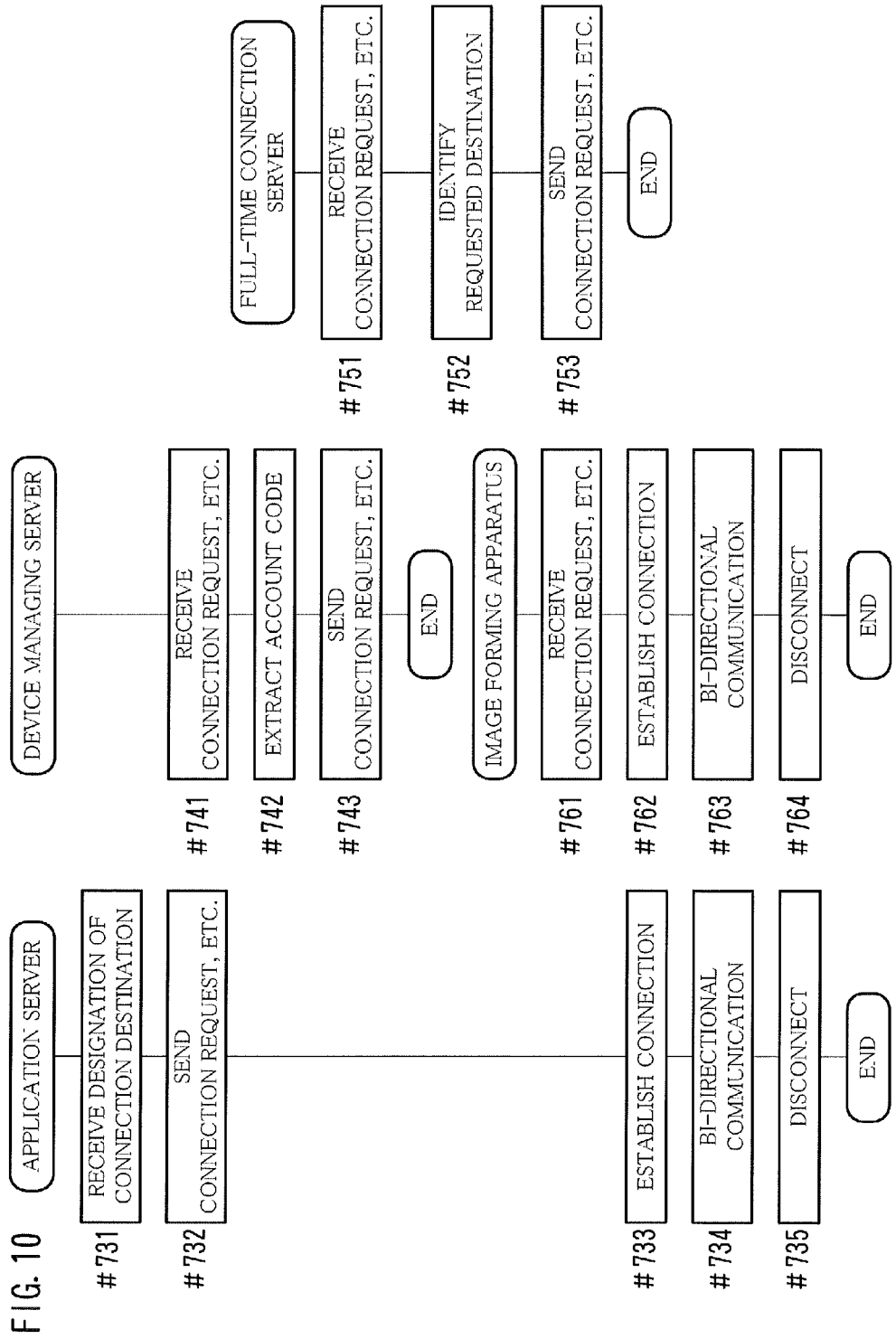
FIG. 10 is a flowchart depicting an example of the flow of processing for a case where an application server and an image forming apparatus work in coordination with each other.

FIG. 9 is a diagram showing an example as to how information is conveyed for a case where the application server 3A and the image forming apparatus 1A work in coordination with each other. FIG. 10 is a flowchart depicting an example of the flow of processing for a case where the application server 3A and the image forming apparatus 1A work in coordination with each other.

The user operates his/her terminal 3B to get service from the image forming apparatus 1A and the application server 3A.

The application-specific interface 301 of the application server 3A is an interface between the application software 3PS and the device connection request portion 302/communication session portion 303. As described later, the device connection request portion 302 controls communication with the device managing server 2A, and the communication session portion 303 controls communication with the image forming apparatus 1A. Therefore, the application-specific interface 301 is an interface between the application software 3PS and the device managing server 2A/image forming apparatus 1A. The concrete role of the application-specific interface 301 is described in order.

The description is provided below with reference to FIGS. 9 and 10 by taking an example in which the image forming apparatus 1Aa is caused to print a document prepared by the user who operates the terminal 3Ba to use the application software 3PS1 of the application server 3Aa. The application software 3PS1 is application software to create a document or chart through a web browser. This type of software which causes a server to perform processing via a web browser is generally called a "web application" or "cloud application".

For example, the user starts a web browser of the terminal 3Ba at a business destination to have access to the application software 3PS1 of the application server 3Aa.

The user creates a document and selects, from among the list, an image forming apparatus 1A which is to be used to print out the document. In this example, the user selects the image forming apparatus 1Aa1 installed in his/her office. The application software 3PS1 preferably obtains the list from the application-specific interface 301 and presents the list to the user (encircled numbers 1 and 2 of FIG. 9). As data for the list, the device identifier 6A and the device name 6C of each of the image forming apparatuses 1A are preferably obtained from the device managing server 2A regularly and registered into the application-specific interface 301.

When the application-specific interface 301 is informed of the selection (encircled number 3, and #731 of FIG. 10), the device connection request portion 302 sends a device connection request 6G to the device managing server 2A; thereby makes a request to connect to the image forming apparatus 1Aa1 (encircled numbers 4 and 5, and Step #732). At this time, address information 6F and the device identifier 6A of the selected image forming apparatus 1A (image forming apparatus 1Aa1 in this example) are also sent to the device managing server 2A. The address information 6F is a Uniform Resource Locator (URL) for the image forming apparatus 1Aa1 to have access to the application software 3PS1. The URL includes an address (domain name) of the application server 3Aa, an identifier of a web page, an identifier (job ID) of a job to be executed by the application server 3Aa and the image forming apparatus 1Aa1, and a port number of a listen port. An example of the URL is as follows: "https://www.example.com/print_service?job_id=j00123:60001". As the listen port, unused port is used from among ports within a predetermined region. As the job ID, a unique ID is issued.

With the device managing server 2A, when receiving the device identifier 6A, the address information 6F, and the device connection request 6G (Step #741), the device connection request sending and receiving portion 202 calls an account code 6B corresponding to the device identifier 6A from the device management table 2TL1 (see FIG. 6) (encircled number 6, and Step #742). The device connection request sending and receiving portion 202 then sends the device identifier 6A, the account code 6B, the address information 6F, and the device connection request 6G to the full-time connection server 2B (encircled number 7, and Step #743).

With the full-time connection server 2B, when receiving the device identifier 6A, the account code 6B, the address information 6F, and the device connection request 6G (Step #751), the device connection request sending and receiving portion 252 finds out an image forming apparatus 1A having a gateway portion corresponding to the requested device based on the account code 6B (Step #752). In this embodiment, the requested device, namely, the image forming apparatus 1Aa1, is the image forming apparatus 1A having the gateway portion.

The device connection request sending and receiving portion 252 sends the device identifier 6A, the address information 6F, and the device connection request 6G to the image forming apparatus 1A found out, i.e., the image forming apparatus 1Aa1, via the tunnel for the session already established (see Steps #704 and #715 of FIG. 8) (encircled number 8, and Step #753). Stated differently, the device identifier 6A, the address information 6F, and the device connection request 6G are encapsulated in accordance with a protocol of the tunnel, and the resultant is sent to the image forming apparatus 1Aa1.

With the image forming apparatus 1Aa1, when the device connection request receiving portion 103 receives the device identifier 6A, the address information 6F, and the device connection request 6G (Step #761), the communication session portion 104 has access to the application server 3A based on the address information 6F, and the communication session portion 104 and the communication session portion 303 of the application server 3A establish a session between the application server 3Aa and the image forming apparatus 1Aa1 (encircled number 9, Steps #733 and #762). Thereby, tunneling is completed.

Data is sent and received between the application software 3PS1 of the application server 3Aa and the operating system or the application software of the image forming apparatus 1Aa1 via the tunnel, the device-specific interface 105, the communication session portion 104, the application-specific interface 301, and the communication session portion 303 (encircled number 10, and Steps #734 and #763). For example, document data and data on print result are sent and received therebetween.

Data transmission to the application server 3Aa is made to a port corresponding to a port number indicated in the address information 6F. The data conforms to a protocol depending on service, i.e., TCP, User Datagram Protocol (UDP), SNMP, Line Printer daemon Protocol (LPR), or HTTP. The data is stored in a BODY section of HTTP or HTTPS, and is sent and received between the application server 3Aa and the image forming apparatus 1Aa1.

When necessary exchange of data is completed, the communication session portion 104 and the communication session portion 303 are disconnected from each other (Steps #735 and #764).

A case where the device identifier 6A received by the image forming apparatus 1Aa1 does not correspond to the subject image forming apparatus 1Aa1 is discussed later.

According to the first embodiment, after the session between the image forming apparatus 1A and the application server 3A is established, processing by the device managing server 2A and the full-time connection server 2B is unnecessary. Accordingly, the communication between the application server 3A and the image forming apparatus 1A via the firewall 1D can be performed with loads on the device managing server 2A and the full-time connection server 2B reduced as compared with the conventional system.

Second Embodiment

Figure 11:
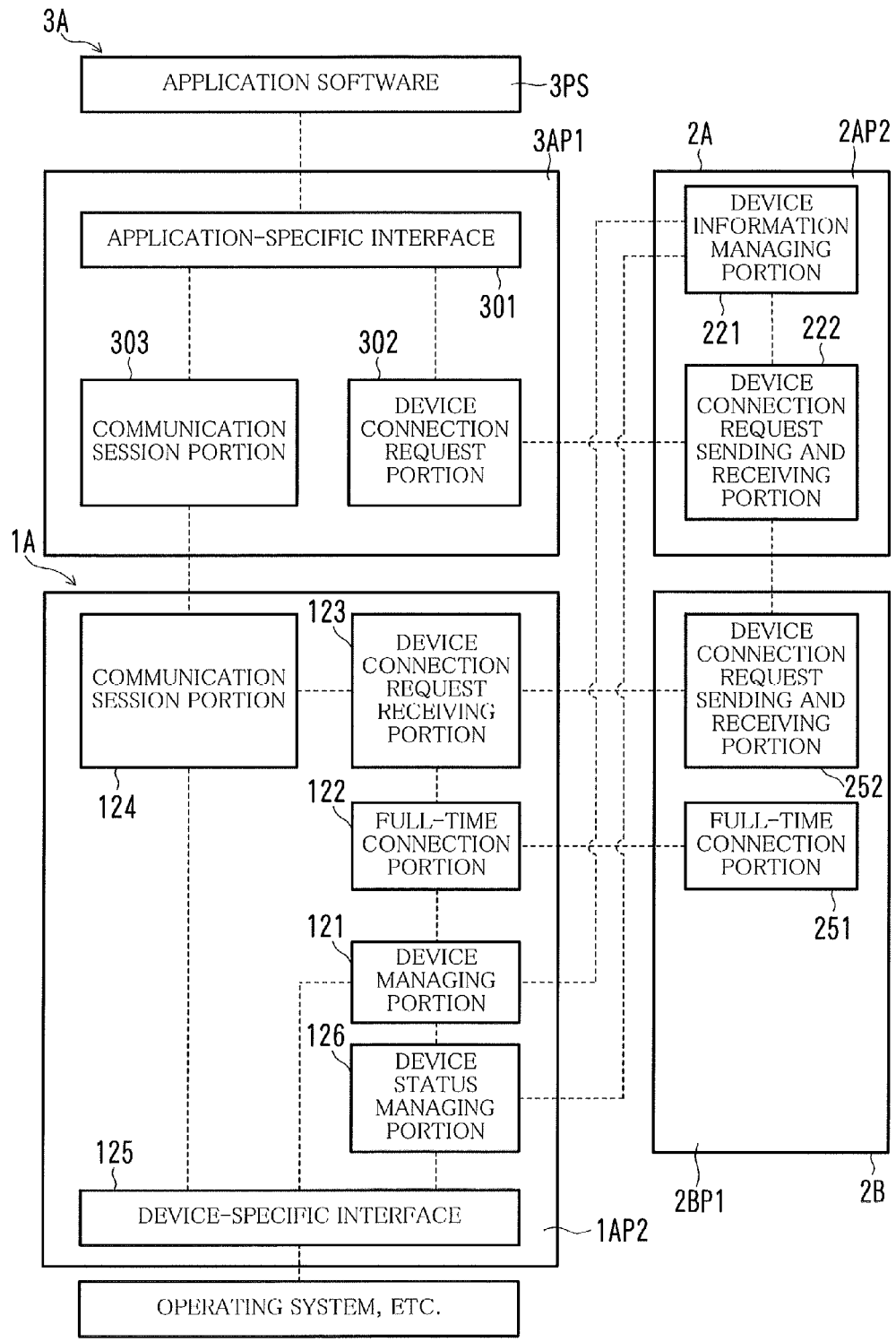
FIG. 11 is a diagram showing an example of the functional configuration of each device of an application system.
Figure 12:
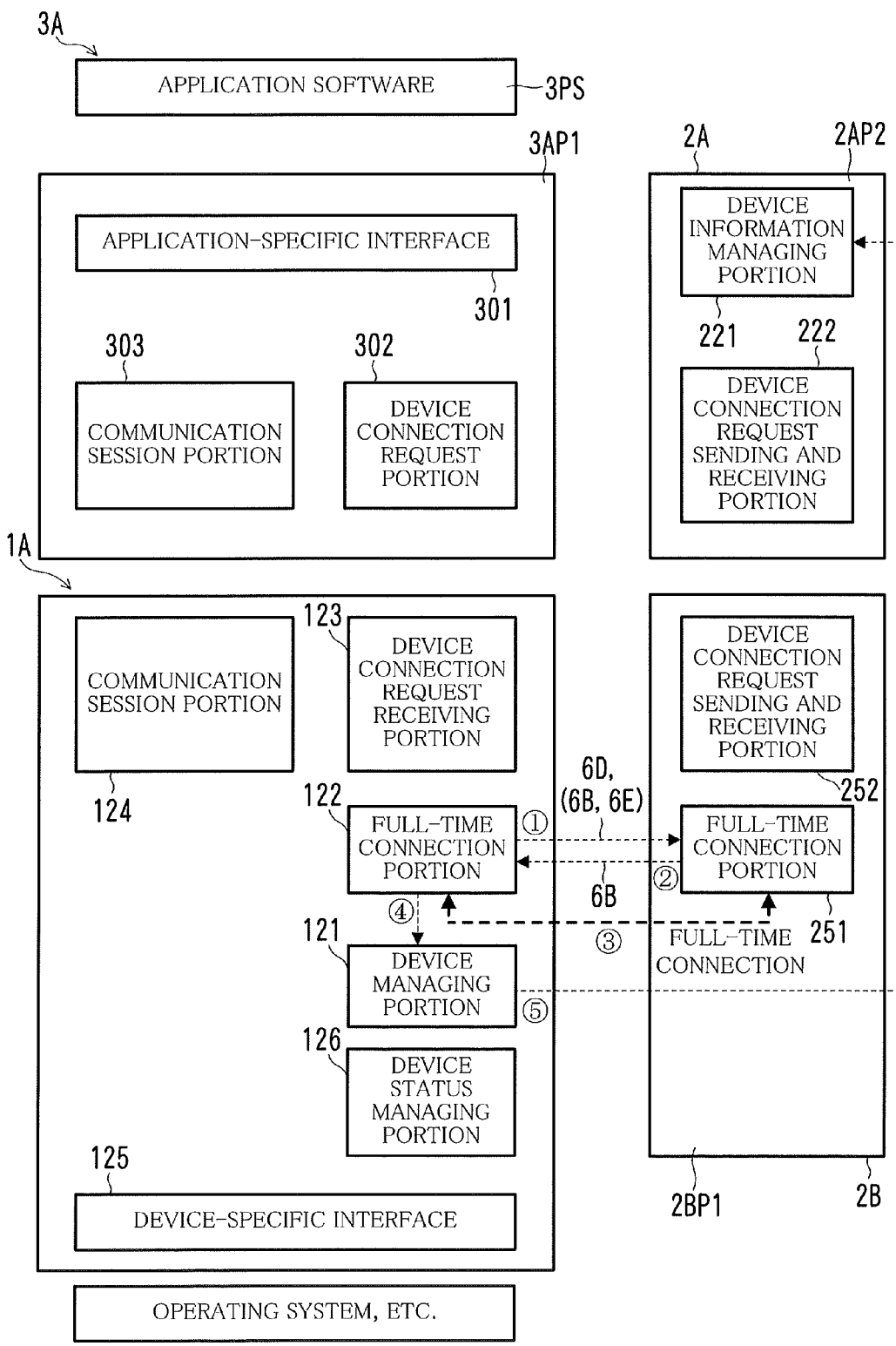
FIG. 12 is a diagram showing an example as to how information is conveyed for a setup.
Figure 13:
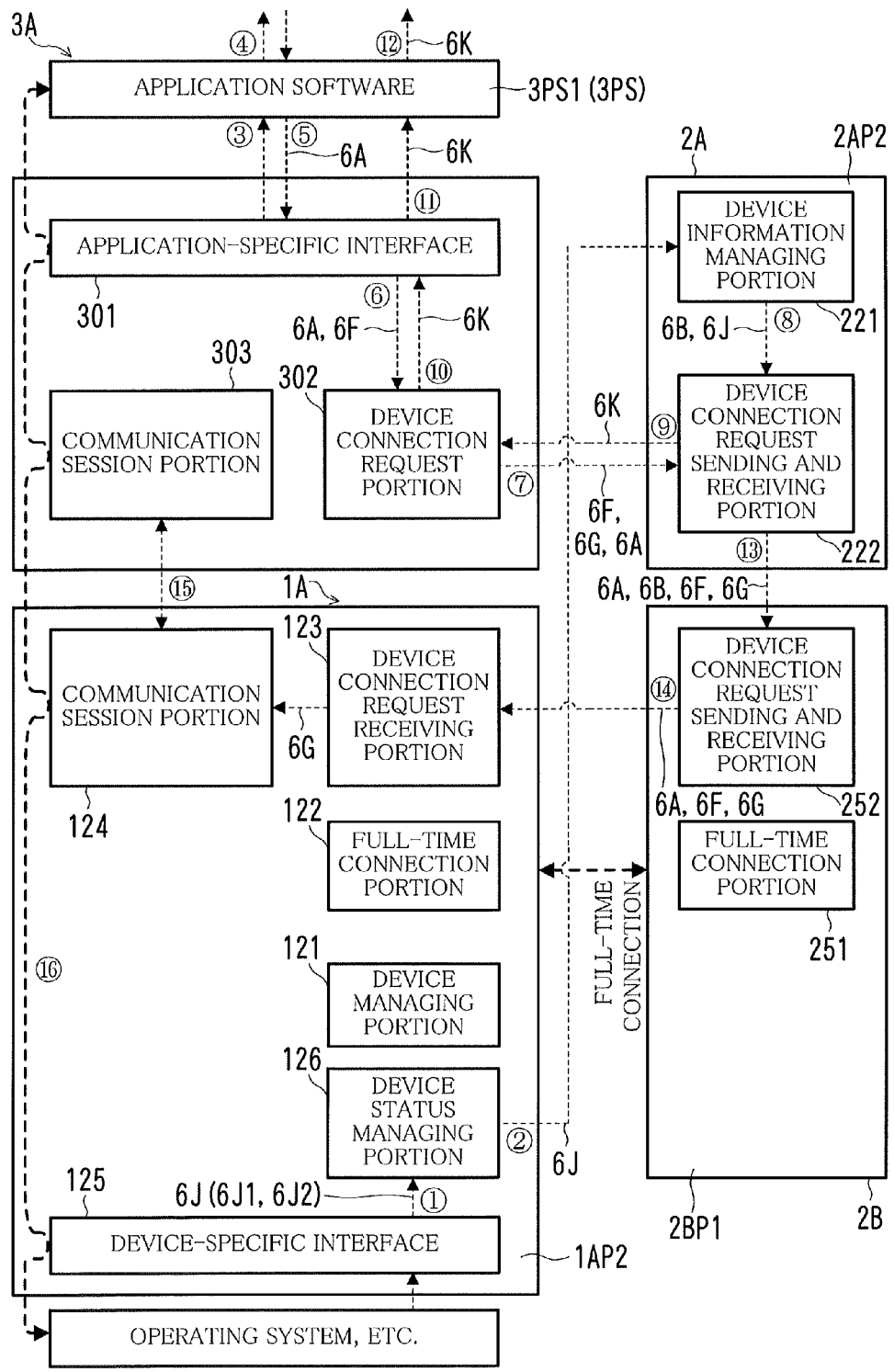
FIG. 13 is a diagram showing an example as to how information is conveyed for a case where an application server and an image forming apparatus work in coordination with each other.
Figure 15:
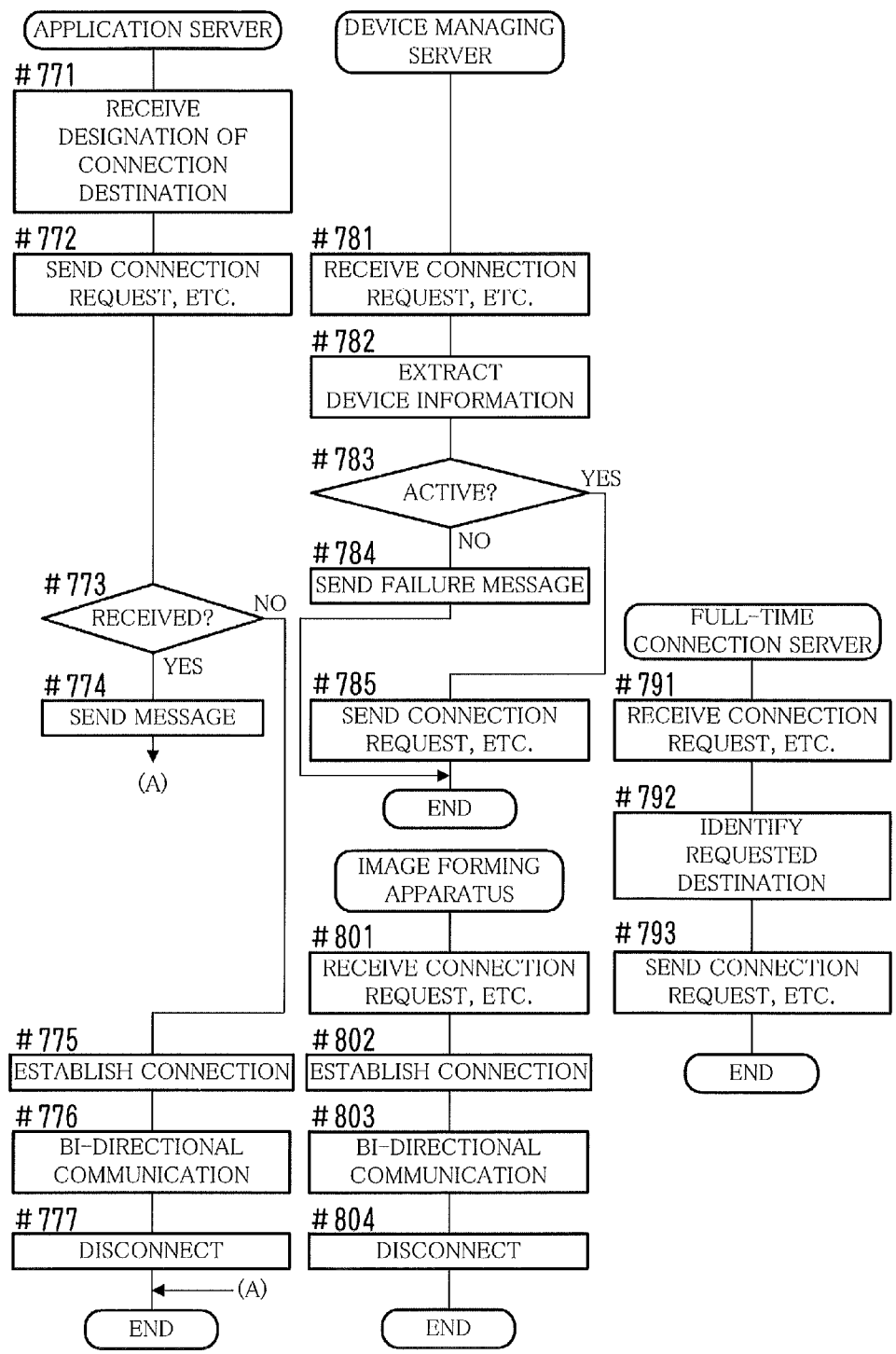
FIG. 15 is a flowchart depicting an example of the flow of processing for a case where an application server and an image forming apparatus work in coordination with each other.

FIG. 11 is a diagram showing an example of the functional configuration of each device of the application system 5. FIG. 12 is a diagram showing an example as to how information is conveyed for a setup. FIG. 13 is a diagram showing an example as to how information is conveyed for a case where the application server 3A and the image forming apparatus 1A work in coordination with each other. FIG. 14 is a diagram showing an example of a device management table 2TL2. FIG. 15 is a flowchart depicting an example of the flow of processing for a case where the application server 3A and the image forming apparatus 1A work in coordination with each other.

In the first embodiment, the device managing server 2A sends the device connection request 6G to the image forming apparatus 1A independently of the status of the image forming apparatus 1A. According to the second embodiment, however, the device connection request 6G is sent depending on the status of the image forming apparatus 1A.

The overall configuration of the application system 5 according to the second embodiment is the same as that of the first embodiment shown in FIG. 1. The overall configuration of the LAN 50 according to the second embodiment is also the same as that of the first embodiment shown in FIG. 2.

The hardware configuration of each of the image forming apparatus 1A, the device managing server 2A, the full-time connection server 2B, and the application server 3A is also the same as those of the first embodiment shown in FIGS. 3 and 4.

In the second embodiment, however, the ROM 10c or the large-capacity storage 10d of the image forming apparatus 1A stores, therein, a gateway program 1AP2 instead of the gateway program 1AP1. Further, the ROM 20c or the large-capacity storage 20d of the device managing server 2A stores, therein, a device management program 2AP2 instead of the device management program 2AP1.

The gateway program 1AP2 implements the functions of a device managing portion 121, a full-time connection portion 122, a device connection request receiving portion 123, a communication session portion 124, a device-specific interface 125, and a device status managing portion 126, all of which are shown in FIG. 11. The device management program 2AP2 implements the functions of a device information managing portion 221 and a device connection request sending and receiving portion 222.

The description goes on to processing by the individual portions shown in FIG. 11. Description of points common to the first embodiment shall be omitted.

The setup processing is basically the same as that of the first embodiment. To be specific, the device managing portion 121 through the device-specific interface 125 of the image forming apparatus 1A perform processing as shown in FIG. 12 in a manner similar to that of the device managing portion 101 through the device-specific interface 105 of the first embodiment (see FIG. 7).

The device status managing portion 126 obtains status information 6J on the current status of the subject image forming apparatus 1A via the device-specific interface 125 (encircled number 1 of FIG. 13), and sends the status information 6J to the device managing server 2A (encircled number 2). According to this embodiment, if the subject image forming apparatus 1A stands ready to provide predetermined service to a device outside the LAN 50, then the device status managing portion 126 sends, as the status information 6J, active status information 6J1 indicating that the subject image forming apparatus 1A is "active". Otherwise, the device status managing portion 126 sends, as the status information 6J, non-active status information 6J2 indicating that the subject image forming apparatus 1A is "non-active".

For example, the device status managing portion 126 sends the active status information 6J1 if the subject image forming apparatus 1A connects to the Internet, the application software 3PS for this service is started, and a certain resource for the service is ensured. The device status managing portion 126 sends the non-active status information 6J2 if the communication fails, the application software 3PS is disabled, or a load on the subject image forming apparatus 1A reaches a predetermined level or greater.

The device information managing portion 221 of the device managing server 2A stores and manages the device management table 2TL2 as shown in FIG. 14. The device management table 2TL2 has records showing a device identifier 6A, an account code 6B, a device name 6C, and status information 6J for each of the image forming apparatuses 1A connected to the full-time connection server 2B.

As with the case of the first embodiment, the device information managing portion 221 registers the device identifier 6A, the account code 6B, and the device name 6C into the device management table 2TL2 in the same manner as that described with reference to FIGS. 7 and 8.

Every time the status information 6J is sent from the image forming apparatus 1A, the device information managing portion 221 associates the status information 6J with the corresponding image forming apparatus 1A and registers the resultant into the device management table 2TL2. If the status information 6J of the corresponding image forming apparatus 1A is already registered in the device management table 2TL2, the old status information 6J is deleted therefrom, and the new status information 6J is registered therein.

In this way, the status information 6J is updated in the device management table 2TL2. For example, when the active status information 6J1 is sent from the image forming apparatus 1Aa1, the status information 6J of the image forming apparatus 1Aa1 in the device management table 2TL2 is updated with "active". When the non-active status information 6J2 is sent from the image forming apparatus 1Aa1, the status information 6J of the image forming apparatus 1Aa1 is updated with "non-active".

The flow of processing by the portions shown in FIG. 11 is described below with reference to FIGS. 13 and 15 by taking an example in which the image forming apparatus 1Aa is caused to print a document prepared by the user who operates the terminal 3Ba to use the application software 3PS1 of the application server 3Aa. Note that the processing of encircled numbers 1 and 2 of FIG. 13 is performed independently of the processing of encircled numbers 3-16.

The operation by the user is the same as that of the first embodiment. To be specific, the user starts a web browser of the terminal 3Ba to have access to the application software 3PS1 of the application server 3Aa. The user creates a document and selects the image forming apparatus 1Aa1 as a connection destination.

The application-specific interface 301 and the device connection request portion 302 of the application server 3Aa perform processing for sending a request to the device managing server 2A (encircled numbers 3-7 of FIG. 13, and Steps #771 and #772 of FIG. 15). The processing is similar to that shown in encircled numbers 1-5 of FIG. 9, and Steps #731 and #732 of FIG. 10. In this way, the device identifier 6A, the address information 6F, and the device connection request 6G of the image forming apparatus 1Aa1 are sent to the device managing server 2A.

With the device managing server 2A, when receiving the device identifier 6A, the address information 6F, and the device connection request 6G (Step #781), the device connection request sending and receiving portion 222 calls an account code 6B and status information 6J corresponding to the device identifier 6A from the device management table 2TL2 (see FIG. 14) (encircled number 8, and Step #782).

If the status information 6J indicates "non-active" (No in Step #783), then the device connection request sending and receiving portion 222 sends, to the application server 3Aa, a failure message 6K saying that connection to the image forming apparatus 1Aa1 is impossible (encircled number 9, and Step #784). With the application server 3Aa, the device connection request portion 302 receives the failure message 6K (encircled number 10, and Yes in Step #773), the failure message 6K is given through the application-specific interface 301 to the application software 3PS1 (encircled number 11), and then is transferred to the terminal 3Ba (encircled number 12, and Step #774).

On the other hand, if the status information 6J indicates "active" (Yes in Step #783), then the device connection request sending and receiving portion 222 sends, to the full-time connection server 2B, the device identifier 6A, the account code 6B, the address information 6F, and the device connection request 6G (encircled number 13, and Step #785).

The subsequent processing by the portions of the full-time connection server 2B, the image forming apparatus 1Aa1, and the application server 3Aa is the same as that of the first embodiment. To be specific, the subsequent processing is the same as that described with reference to encircled numbers 8-10 of FIG. 9, and Steps #751-#753, #761-#764, and #733-#735 of FIG. 10 (encircled numbers 14-16, Steps #791-#793, #801-#804, and #775-#777). The processing enables communication between the image forming apparatus 1Aa1 and the application server 3Aa through a tunnel.

According to the second embodiment, a request to an image forming apparatus 1A which is not active can be stopped. This reduces unnecessary traffic and unnecessary processing by the full-time connection server 2B.

In the foregoing example, the device managing server 2A determines whether or not a request is made to the image forming apparatus 1A. Instead of the device managing server 2A, the application server 3A may make the determination. In such a case, the device managing server 2A provides the application server 3A with the status information 6J for each of the image forming apparatuses 1A. With the application server 3A, if the status information 6J for the image forming apparatus 1A selected by the user indicates "active", then the device connection request portion 302 preferably sends the device identifier 6A, the address information 6F, and the device connection request 6G to the device managing server 2A. On the other hand, if the status information 6J indicates "non-active", then the transmission is stopped and the failure message 6K is sent to the terminal 3B.

Third Embodiment

Figure 16:
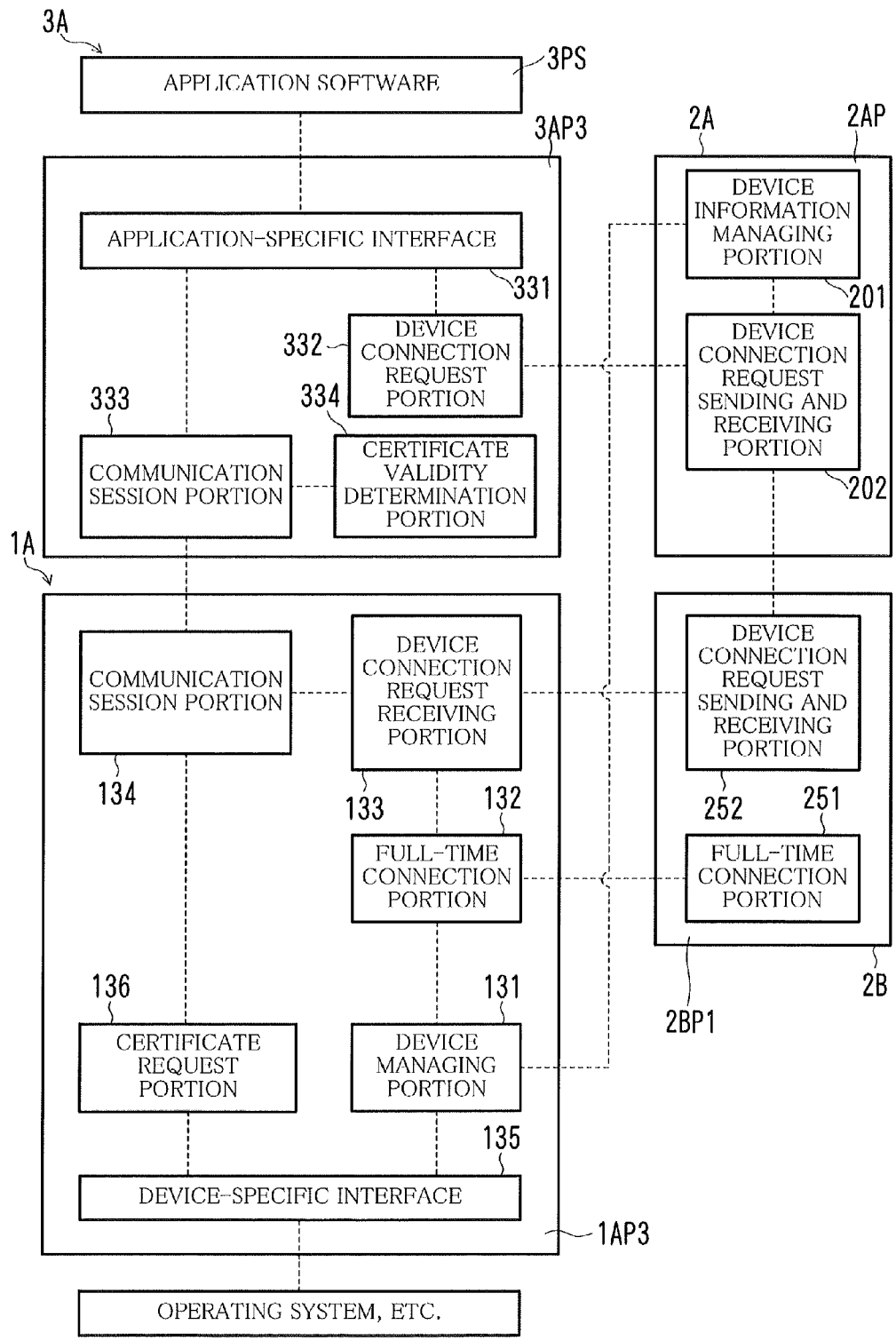
FIG. 16 is a diagram showing an example of the functional configuration of each device of an application system.
Figure 17:
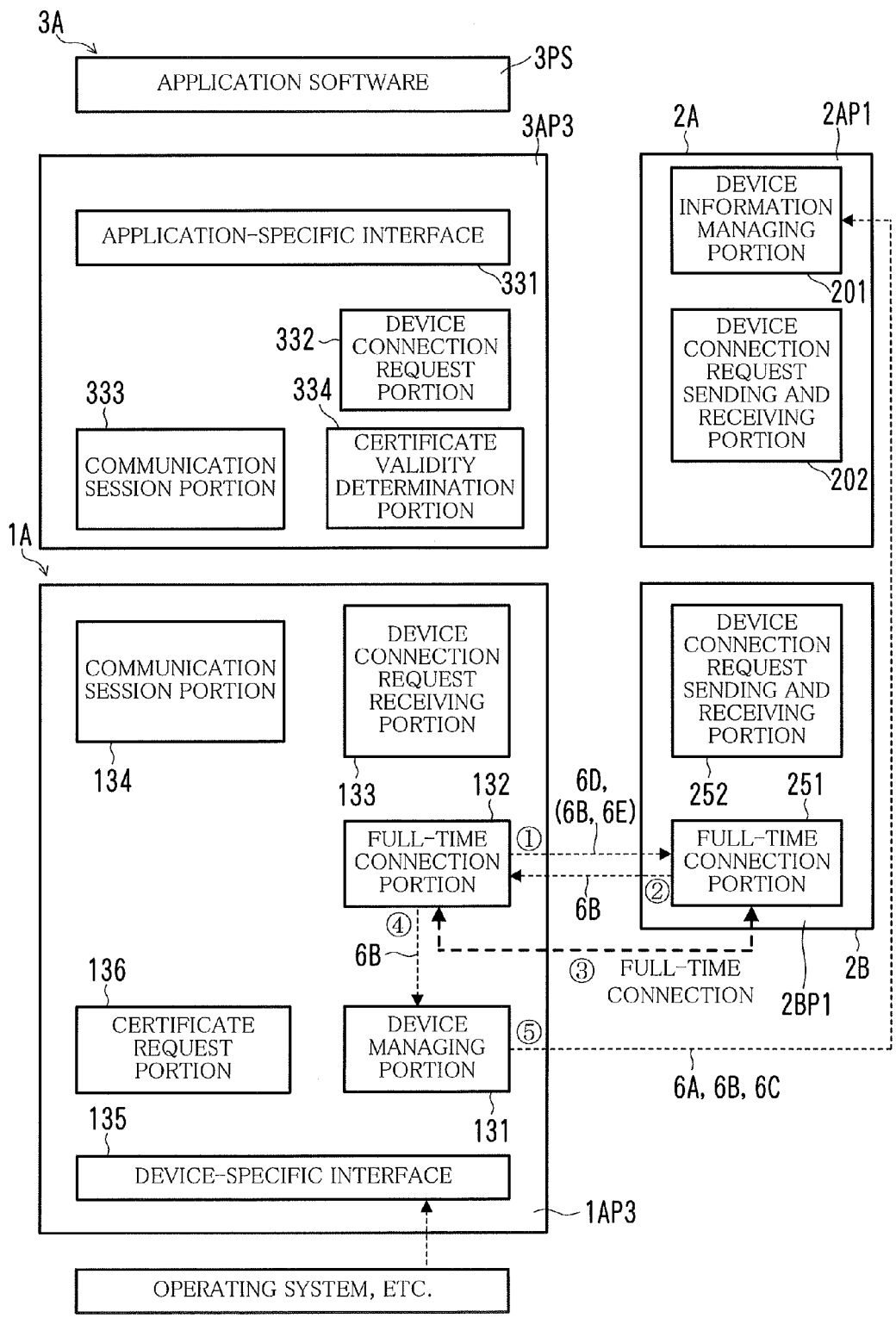
FIG. 17 is a diagram showing an example as to how information is conveyed for a setup.
Figure 18:
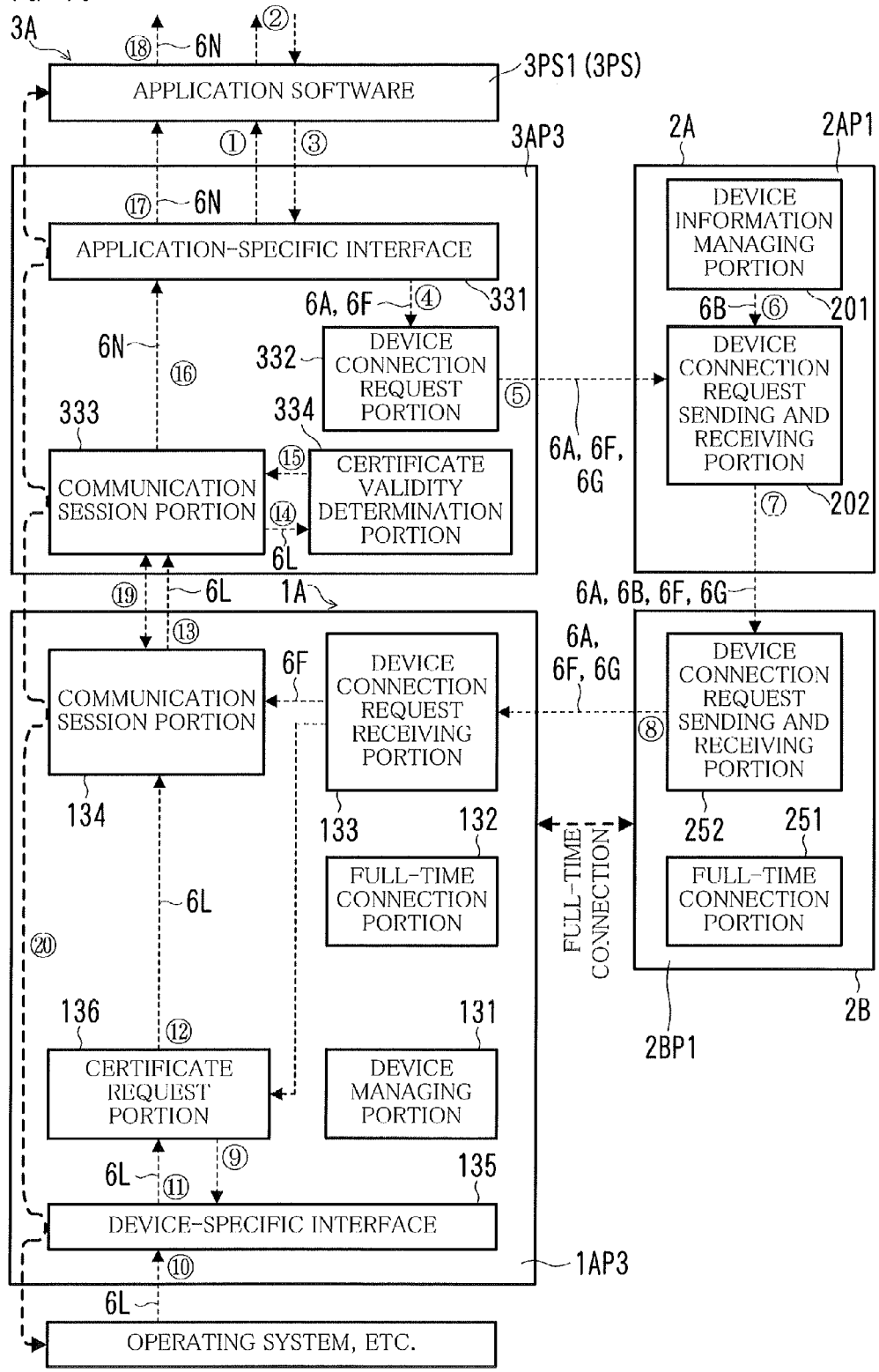
FIG. 18 is a diagram showing an example as to how information is conveyed for a case where an application server and an image forming apparatus work in coordination with each other.
Figure 19:
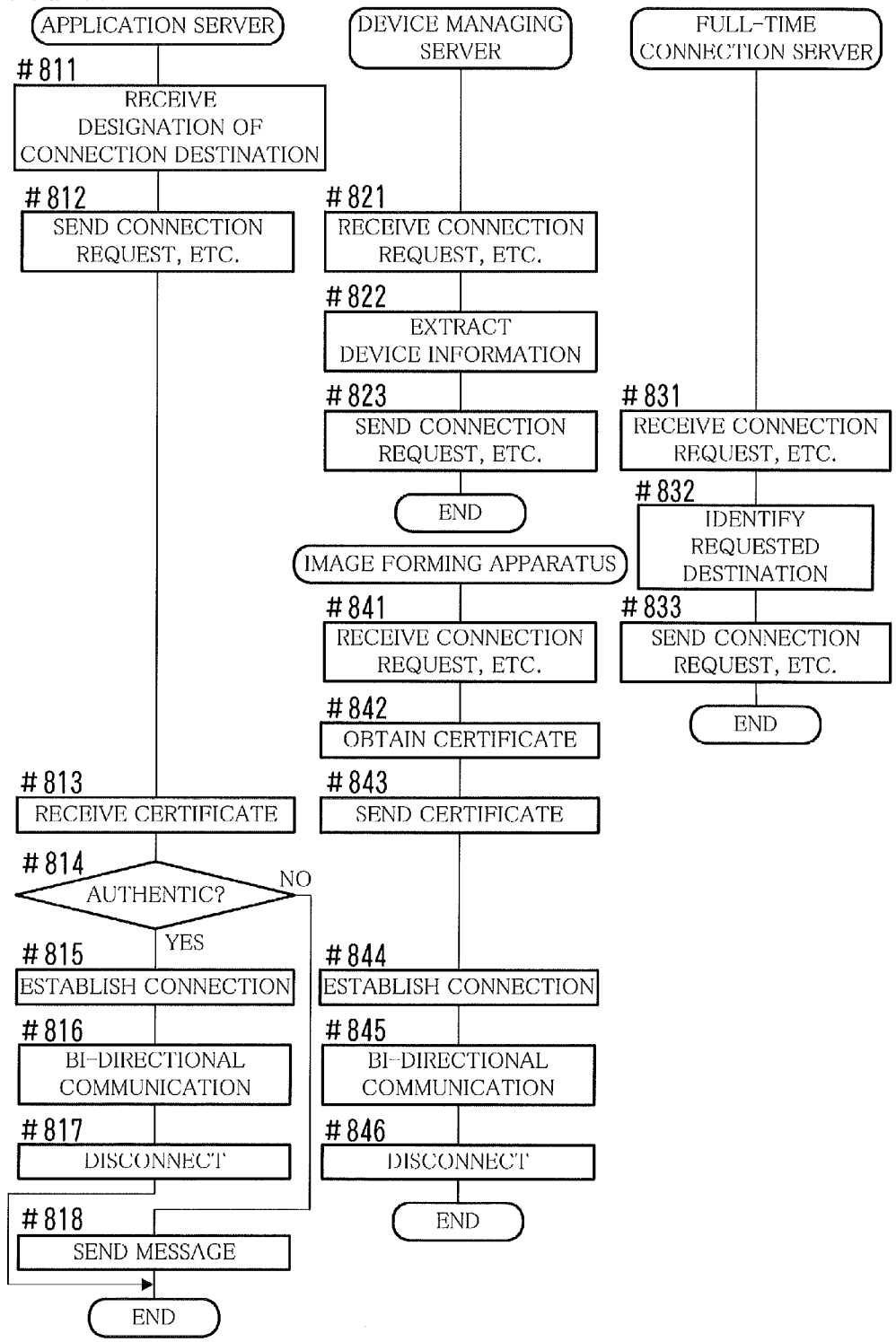
FIG. 19 is a flowchart depicting an example of the flow of processing for a case where an application server and an image forming apparatus work in coordination with each other.

FIG. 16 is a diagram showing an example of the functional configuration of each device of the application system 5. FIG. 17 is a diagram showing an example as to how information is conveyed for a setup. FIG. 18 is a diagram showing an example as to how information is conveyed for a case where the application server 3A and the image forming apparatus 1A work in coordination with each other. FIG. 19 is a flowchart depicting an example of the flow of processing for a case where the application server 3A and the image forming apparatus 1A work in coordination with each other.

In the first and second embodiments, the application server 3A establishes a session with the image forming apparatus 1A without verifying the image forming apparatus 1A. In the third embodiment, however, verification as to the identity of the image forming apparatus 1A is performed, and after that, session therewith is established.

The overall configuration of the application system 5 according to the third embodiment is the same as that of each of the first and second embodiments shown in FIG. 1. The overall configuration of the LAN 50 according to the third embodiment is also the same as that of each of the first and second embodiments shown in FIG. 2.

The hardware configuration of each of the image forming apparatus 1A, the device managing server 2A, the full-time connection server 2B, and the application server 3A is the same as those of the first embodiment shown in FIGS. 3 and 4.

In the third embodiment, however, the ROM 10c or the large-capacity storage 10d of the image forming apparatus 1A stores, therein, a gateway program 1AP3 instead of the gateway program 1AP1 or 1AP2. Further, the ROM or the large-capacity storage of the application server 3A stores, therein, an access program 3AP3 instead of the access program 3AP1.

The gateway program 1AP3 implements the functions of a device managing portion 131, a full-time connection portion 132, a device connection request receiving portion 133, a communication session portion 134, a device-specific interface 135, and a certificate request portion 136, all of which are shown in FIG. 16. The access program 3AP3 implements the functions of an application-specific interface 331, a device connection request portion 332, a communication session portion 333, and a certificate validity determination portion 334.

The description goes on to processing by the individual portions shown in FIG. 16. Description of points common to the first or second embodiment shall be omitted.

The setup processing is basically the same as that of each of the first and second embodiments. To be specific, the device managing portion 131 through the device-specific interface 135 of the image forming apparatus 1A perform processing as shown in FIG. 17 in a manner similar to that of the device managing portion 101 through the device-specific interface 105 of the first and second embodiments (see FIGS. 7 and 12).

The flow of processing by the portions shown in FIG. 16 is described below with reference to FIGS. 18 and 19 by taking an example in which the image forming apparatus 1Aa is caused to print a document prepared by the user who operates the terminal 3Ba to use the application software 3PS1 of the application server 3Aa.

The operation by the user is the same as that of each of the first and second embodiments. To be specific, the user starts a web browser of the terminal 3Ba to have access to the application software 3PS1 of the application server 3Aa. The user creates a document and selects the image forming apparatus 1Aa1 as a connection destination.

The application-specific interface 331 and the device connection request portion 332 of the application server 3Aa perform processing for sending a request to the device managing server 2A (encircled numbers 1-5 of FIG. 18, and Steps #811 and #812 of FIG. 19). The processing is similar to that shown in encircled numbers 1-5 of FIG. 9, and Steps #731 and #732 of FIG. 10. In this way, the device identifier 6A, the address information 6F, and the device connection request 6G of the image forming apparatus 1Aa1 are sent to the device managing server 2A.

The device managing server 2A and the full-time connection server 2B perform processing for sending the device identifier 6A, the account code 6B, the address information 6F, and the device connection request 6G to the image forming apparatus 1Aa1 (encircled numbers 6-8, Steps #821-#823, and #831-#833). The processing is similar to that shown in encircled numbers 6-8 of FIG. 9, Steps #741-#743, and #751-#753 of FIG. 10.

With the image forming apparatus 1Aa1, when the device connection request receiving portion 133 receives the device identifier 6A, the address information 6F, and the device connection request 6G (Step #841), the certificate request portion 136 requests an electronic certificate 6L from the device-specific interface 135 (encircled number 9), and obtains the same therefrom (encircled numbers 10 and 11, and Step #842). The device-specific interface 135 preferably obtains the electronic certificate 6L from the operating system.

The communication session portion 134 has access to the application server 3Aa based on the address information 6F, and sends the electronic certificate 6L to the application server 3Aa (encircled numbers 12 and 13, and Step #843).

With the application server 3Aa, when the communication session portion 333 receives the electronic certificate 6L (Step #813), the certificate validity determination portion 334 confirms whether or not the electronic certificate 6L is valid, and thereby, checks the authenticity of the image forming apparatus 1Aa1 (encircled number 14, and Step #814). The result of check is sent as the determination result 6M to the communication session portion 333 (encircled number 15).

In response to the receipt of the result, the communication session portion 333 performs the following processing depending on the determination result 6M. To be specific, if the determination result 6M indicates that the image forming apparatus 1Aa1 is not authentic (No in Step #814), then the communication session portion 333 sends a failure message 6N through the application-specific interface 331 to the application software 3PS (encircled number 13). After that, the failure message 6N is transferred to the terminal 3Ba (encircled numbers 16-18, and Step #818).

On the other hand, if the determination result 6M indicates that the image forming apparatus 1Aa1 is authentic (Yes in Step #815), then the communication session portion 333 works in coordination with the communication session portion 134, and a session between the image forming apparatus 1Aa1 and the application server 3Aa is established (encircled number 19, and Steps #815 and #844). In this way, tunneling is completed.

The foregoing processing enables communication between the image forming apparatus 1Aa1 and the application server 3Aa through the tunnel. Data is sent and received therebetween (encircled number 20, and Steps #816 and #845). When necessary communication is completed, the communication session portion 134 and the communication session portion 333 are disconnected from each other (Steps #817 and #846).

According to the third embodiment, it is possible to prevent a session from being established with a device impersonating the image forming apparatus 1A, leading to the enhanced security.

The device managing server 2A or the application server 3A according to the third embodiment may use the mechanism of the second embodiment in which the device connection request 6G and so on are transferred depending on the status of the image forming apparatus 1A.

Fourth Embodiment

Figure 20:
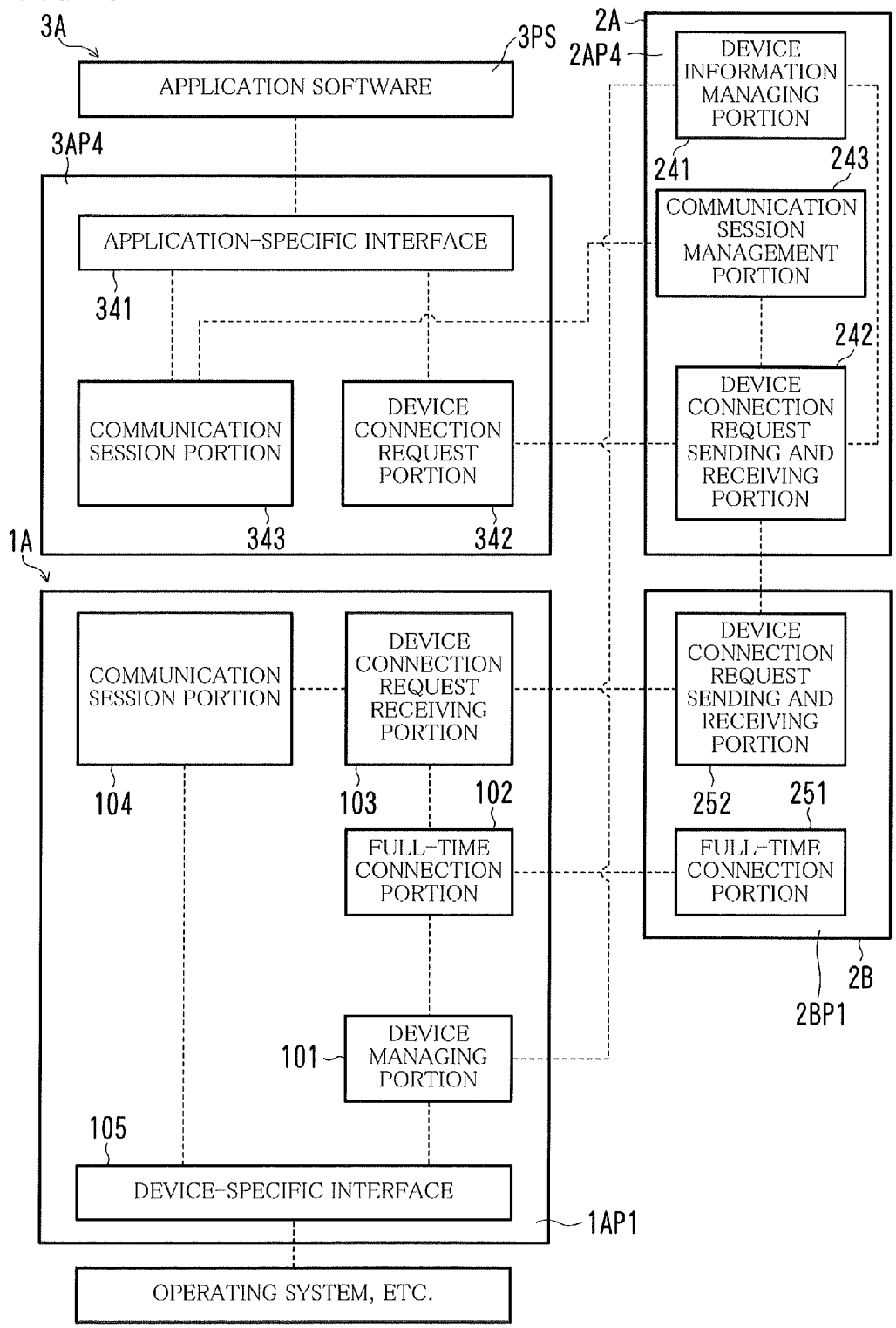
FIG. 20 is a diagram showing an example of the functional configuration of each device of an application system.
Figure 21:
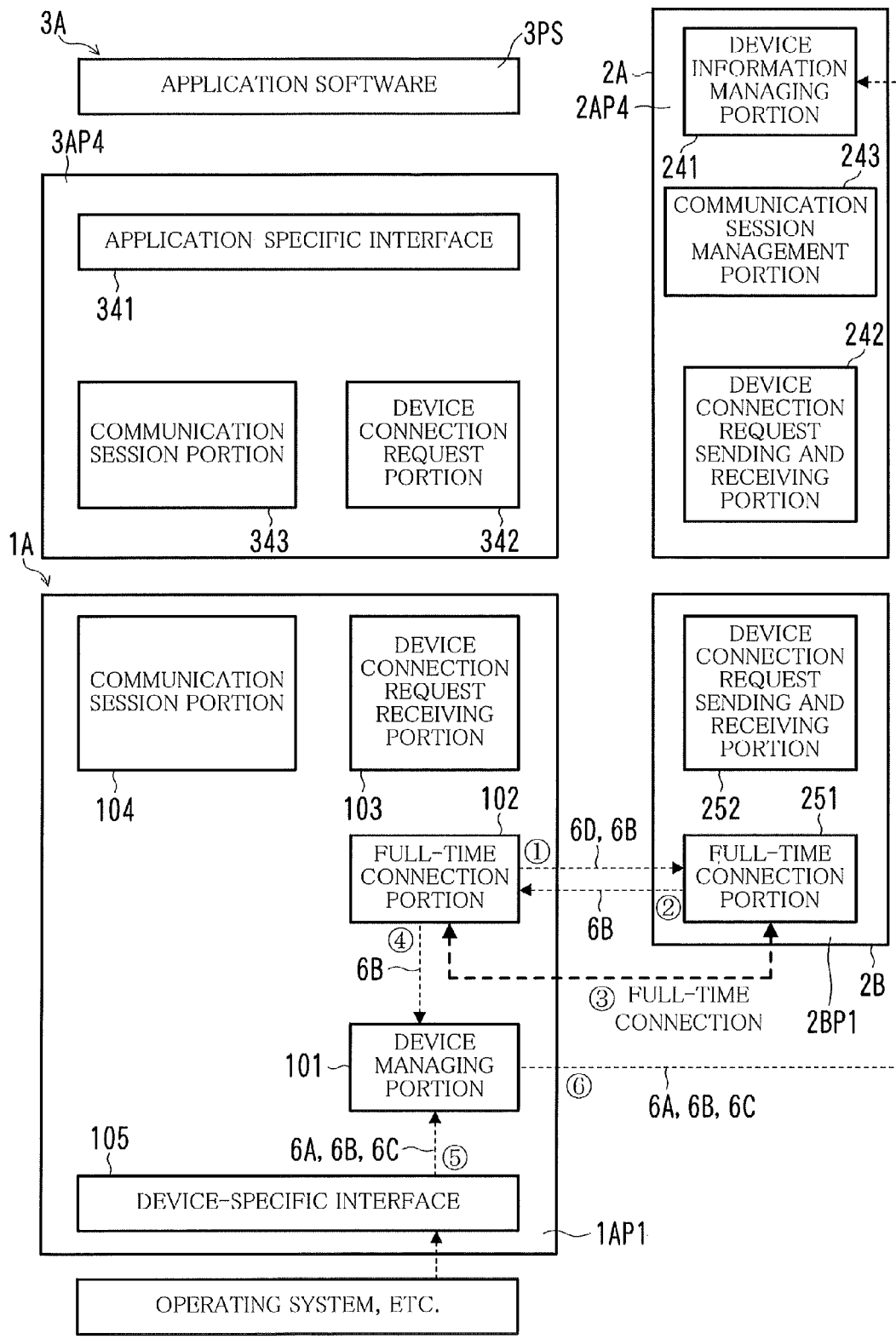
FIG. 21 is a diagram showing an example as to how information is conveyed for a setup.
Figure 23:
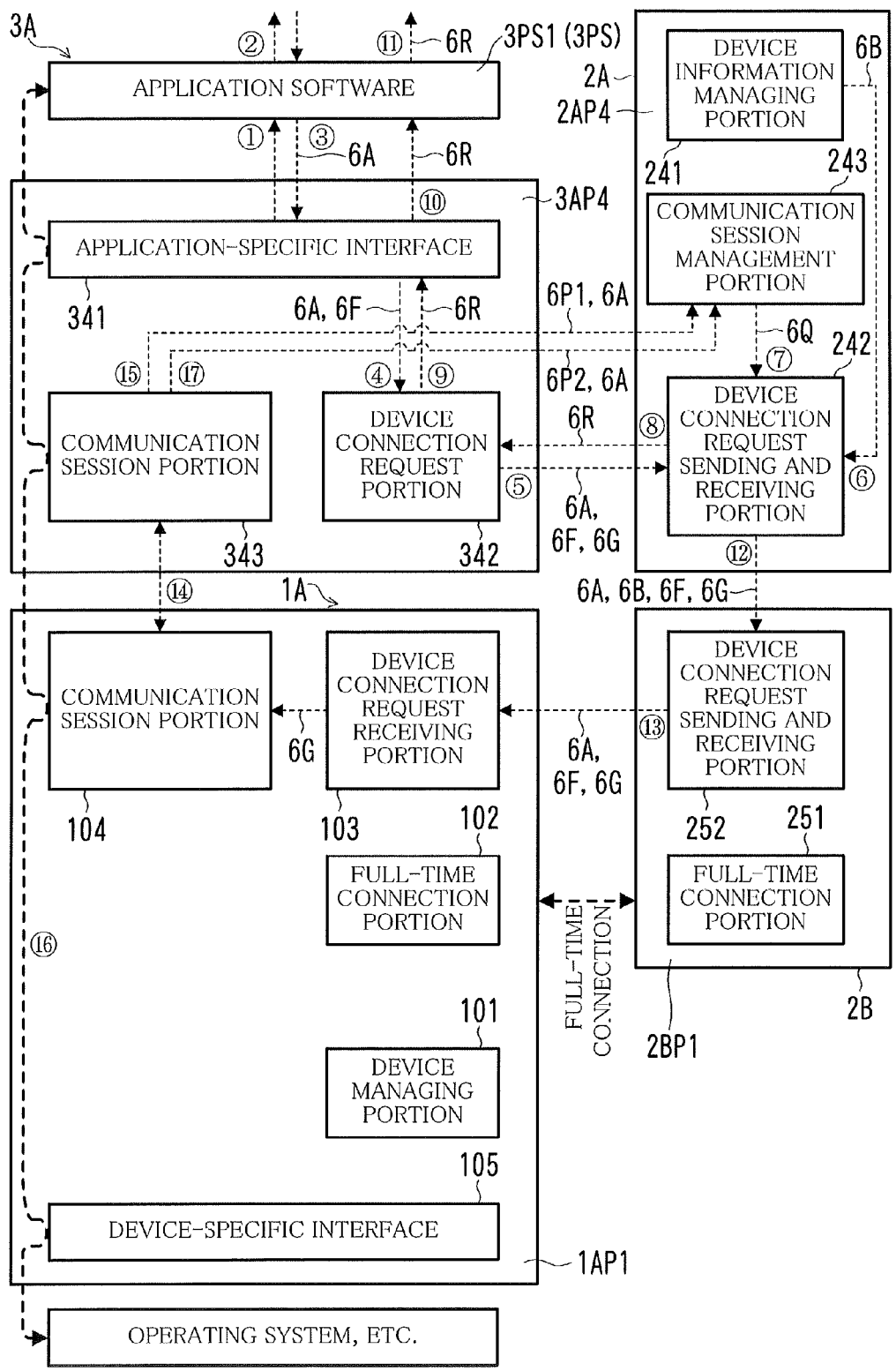
FIG. 23 is a diagram showing an example as to how information is conveyed for a case where an application server and an image forming apparatus work in coordination with each other.
Figure 24:
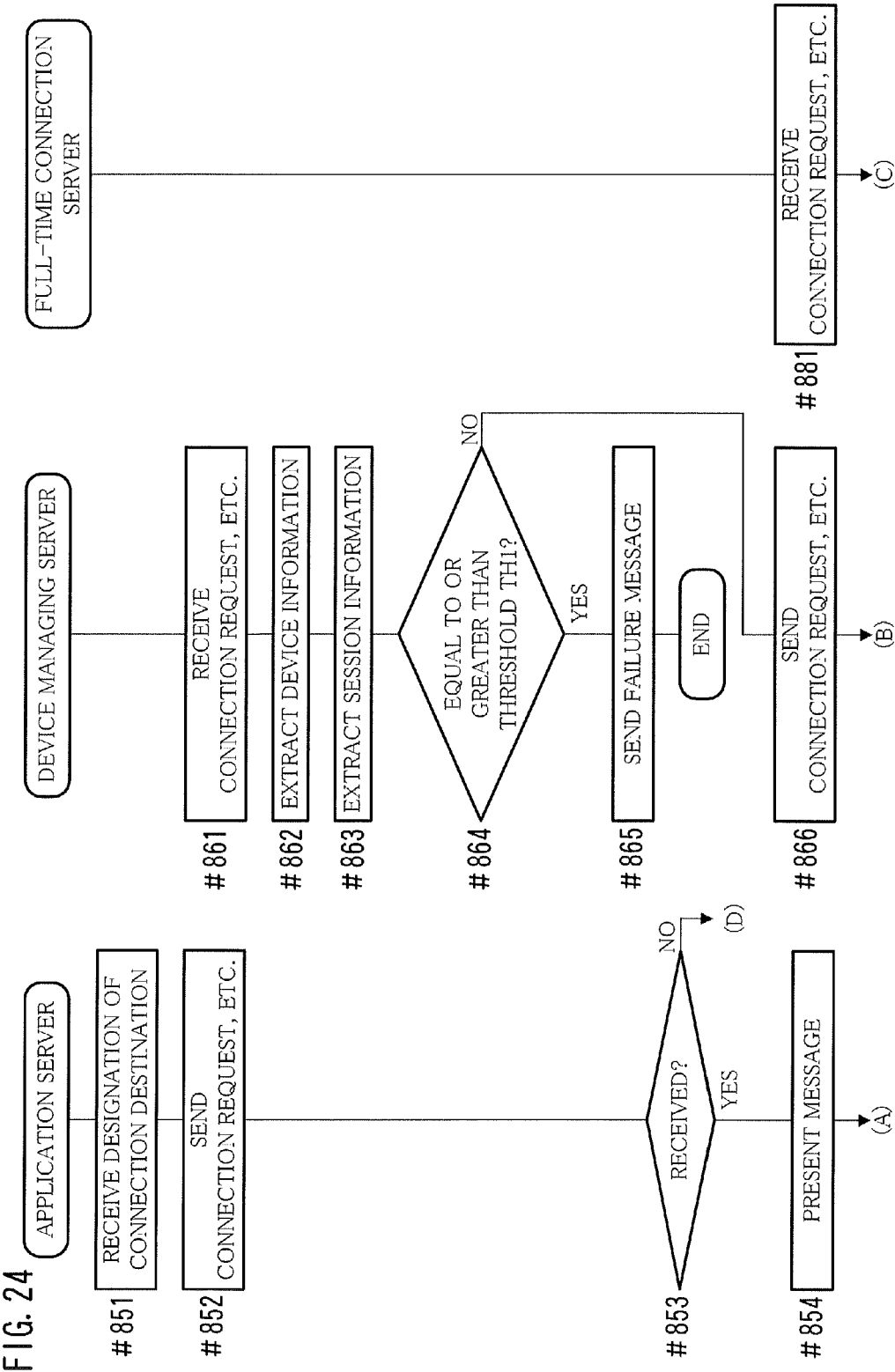
FIG. 24 is a flowchart depicting an example of the flow of processing for a case where an application server and an image forming apparatus work in coordination with each other.
Figure 25:
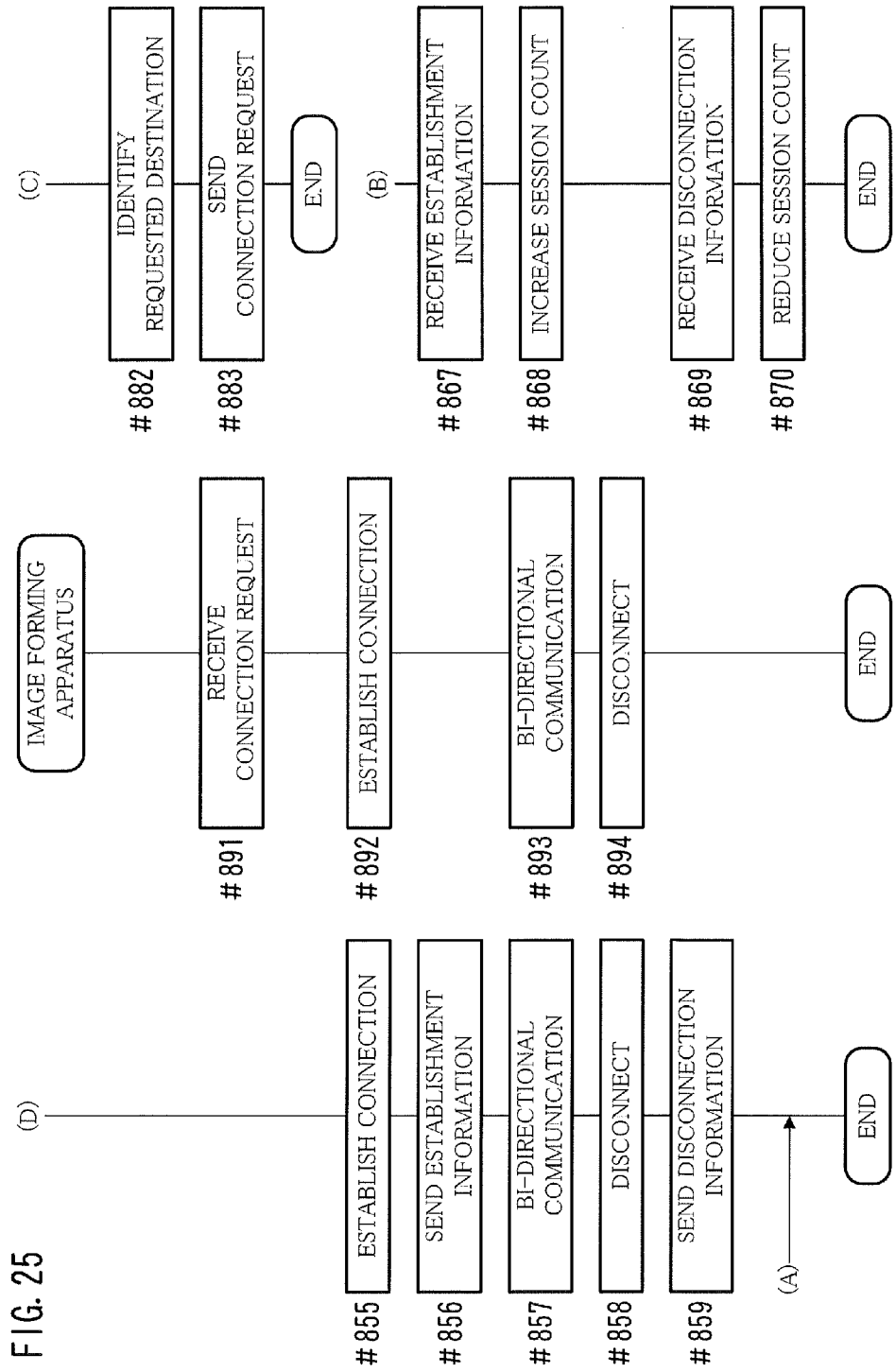
FIG. 25 is a flowchart depicting an example of the flow of processing for a case where an application server and an image forming apparatus work in coordination with each other.

FIG. 20 is a diagram showing an example of the functional configuration of each device of the application system 5. FIG. 21 is a diagram showing an example as to how information is conveyed for a setup. FIG. 22 is a diagram showing an example of a communication session table 2TS4. FIG. 23 is a diagram showing an example as to how information is conveyed for a case where the application server 3A and the image forming apparatus 1A work in coordination with each other. FIGS. 24 and 25 are flowcharts depicting an example of the flow of processing for a case where the application server 3A and the image forming apparatus 1A work in coordination with each other.

In the first and third embodiments, the device managing server 2A sends the device connection request 6G to the image forming apparatus 1A independently of the status of the image forming apparatus 1A. According to the second embodiment, the device connection request 6G is sent if the device managing server 2A is active. According to the fourth embodiment, however, the device connection request 6G is sent in accordance with the number of sessions of the device managing server 2A.

The overall configuration of the application system 5 according to the fourth embodiment is the same as that of each of the first through third embodiments shown in FIG. 1. The overall configuration of the LAN 50 according to the fourth embodiment is also the same as that of each of the first through third embodiments shown in FIG. 2.

The hardware configuration of each of the image forming apparatus 1A, the device managing server 2A, the full-time connection server 2B, and the application server 3A is also the same as those of each of the first through third embodiments shown in FIGS. 3 and 4.

In the fourth embodiment, however, the ROM 20c or the large-capacity storage 20d of the image forming apparatus 2A stores, therein, a device management program 2AP4 instead of the device management program 2AP1 or 2AP2. Further, the ROM or the large-capacity storage of the application server 3A stores, therein, an access program 3AP4 instead of the access program 3AP1 or 3AP3.

The device management program 2AP4 implements the functions of a device information managing portion 241, a device connection request sending and receiving portion 242, and a communication session management portion 243, all of which are shown in FIG. 20. The access program 3AP4 implements the functions of an application-specific interface 341, a device connection request portion 342, and a communication session portion 343.

The description goes on to processing by the individual portions shown in FIG. 20. Description of points common to the first, second, or third embodiment shall be omitted.

The setup processing is basically the same as that of each of the first through third embodiments. To be specific, the device managing portion 101 through the device-specific interface 105 of the image forming apparatus 1A perform processing as shown in FIG. 21. The device information managing portion 241 stores and manages the device management table 2TL1 (see FIG. 6) as with the case of the device information managing portion 201 (see FIG. 7) of the first embodiment.

The communication session portion 343 performs processing for establishing a session with the image forming apparatus 1A, as with the communication session portion 303 of the first embodiment. In addition to this, the communication session portion 343 informs the device managing server 2A of establishment/disconnection of the session with the image forming apparatus 1A in the following manner.

When the session with the image forming apparatus 1A is established, the communication session portion 343 sends, to the device managing server 2A, session start information 6P1 together with the device identifier 6A of the image forming apparatus 1A (see encircled number 15 of FIG. 23). On the other hand, when the session with the image forming apparatus 1A is disconnected, the communication session portion 343 sends, to the device managing server 2A, session termination information 6P2 together with the device identifier 6A of the image forming apparatus 1A (see encircled number 17 of FIG. 23).

With the device managing server 2A, the communication session management portion 243 stores and manages the communication session table 2TS4, shown in FIG. 22, indicating the device identifier 6A and a session count 6Q for each of the image forming apparatuses 1A. The session count 6Q is the number of sessions which are effective at the present time between the corresponding image forming apparatus 1A and the application server 3A. The default of the session count 6Q is "0 (zero)". The session count 6Q is updated in the following manner.

When receiving the session start information 6P1 and the device identifier 6A from the application server 3A, the communication session management portion 243 adds "1" to the session count 6Q corresponding to the device identifier 6A. When receiving the session termination information 6P2 and the device identifier 6A, the communication session management portion 243 reduces, by "1", the session count 6Q corresponding to the device identifier 6A.

The flow of processing by the portions shown in FIG. 20 is described below with reference to FIGS. 23, 24, and 25 by taking an example in which the image forming apparatus 1Aa is caused to print a document prepared by the user who operates the terminal 3Ba to use the application software 3PS1 of the application server 3Aa.

The operation by the user is the same as that of each of the first through third embodiments. To be specific, the user starts a web browser of the terminal 3Ba to have access to the application software 3PS1 of the application server 3Aa. The user creates a document and selects the image forming apparatus 1Aa1 as a connection destination.

The application-specific interface 341 and the device connection request portion 342 of the application server 3Aa perform processing for sending a request to the device managing server 2A (encircled numbers 1-5 of FIG. 23, and Steps #851 and 852 of FIG. 24). The processing is similar to that shown in encircled numbers 1-5 of FIG. 9 and Steps #731 and #732 of FIG. 10. In this way, the device identifier 6A, the address information 6F, and the device connection request 6G of the image forming apparatus 1Aa1 are sent to the device managing server 2A.

With the device managing server 2A, when receiving the device identifier 6A, the address information 6F, and the device connection request 6G (Step #861), the device connection request sending and receiving portion 242 calls an account code 6B corresponding to the device identifier 6A from the device management table 2TL2 (see FIG. 14) (encircled number 6, and Step #862), and calls a session count 6Q corresponding to the device identifier 6A from the communication session table 2TS4 (encircled number 7, and Step #863).

If the session count 6Q is equal to or greater than a threshold TH1 (Yes in Step #864), then the device connection request sending and receiving portion 242 sends, to the application server 3Aa, a failure message 6R saying that connection to the image forming apparatus 1Aa1 is denied (encircled number 8, and Step #865). With the application server 3Aa, when the device connection request portion 342 receives the failure message 6R (Yes in Step #853), the failure message 6R is given through the application-specific interface 341 to the application software 3PS1 (encircled numbers 9 and 10), and is transferred to the terminal 3Ba (encircled number 11, and Step #854).

On the other hand, if the session count 6Q is smaller than the threshold TH1 (No in Step #864), then the device connection request sending and receiving portion 242 sends the device identifier 6A, the account code 6B, the address information 6F, and the device connection request 6G to the full-time connection server 2B (encircled number 12, and Step #866).

The subsequent processing by the portions of the full-time connection server 2B, the image forming apparatus 1Aa1, and the application server 3Aa is basically the same as that of the first embodiment. To be specific, the subsequent processing is basically the same as that described with reference to encircled numbers 8-10 of FIG. 9, and Steps #751-#753, #761-#764, and #733-#735 of FIG. 10 (encircled numbers 13, 14, and 16, Steps #881-#883, #891-#894, #855, #857, and #858). The processing enables communication between the image forming apparatus 1Aa1 and the application server 3Aa through a tunnel.

Unlike the first embodiment, when the session is established, the communication session portion 343 sends, to the device managing server 2A, the session start information 6P1 and the device identifier 6A of the image forming apparatus 1Aa1 (encircled number 15, and Step #856).

Upon the transmission, the communication session management portion 243 adds "1" to the session count 6Q of the image forming apparatus 1Aa1 in the communication session table 2TS4 (Steps #867 and #868).

When the session is disconnected, the communication session portion 343 sends, to the device managing server 2A, the session start information 6P1 and the device identifier 6A of the image forming apparatus 1Aa1 (encircled number 17, and Step #859).

Upon the transmission, the communication session management portion 243 subtracts "1" from the session count 6Q of the image forming apparatus 1Aa1 in the communication session table 2TS4 (Steps #869 and #870).

According to the fourth embodiment, it is possible to cancel a request to the image forming apparatus 1 on which a certain level of load is placed.

In the foregoing example, the device managing server 2A determines whether or not a request is made to the image forming apparatus 1A. Instead of the device managing server 2A, the application server 3A may make the determination. In such a case, the application server 3A preferably makes a record of the session count 6Q for each of the image forming apparatuses 1A. With the application server 3A, if the session count 6Q of the application server 3A selected by the user is smaller than the threshold TH1, then the device connection request portion 342 sends the device identifier 6A, the address information 6F, and the device connection request 6G to the device managing server 2A. On the other hand, if the session count 6Q is equal to or greater than the threshold TH1, then the transmission is stopped and the failure message 6R is sent to the terminal 3B.

The device managing server 2A or the application server 3A of the fourth embodiment may use the mechanism of the second embodiment in which the device connection request 6G is transferred depending on the status of the image forming apparatus 1A.

The image forming apparatus 1A and the application server 3A of the fourth embodiment may use the mechanism of the third embodiment in which the device connection request 6G and so on are transferred in accordance with the result of authentication based on the electronic certificate 6L.

[First Mechanism for Having Access to the Image Forming Apparatus 1A Having No Gateway Portion]

Figure 27:
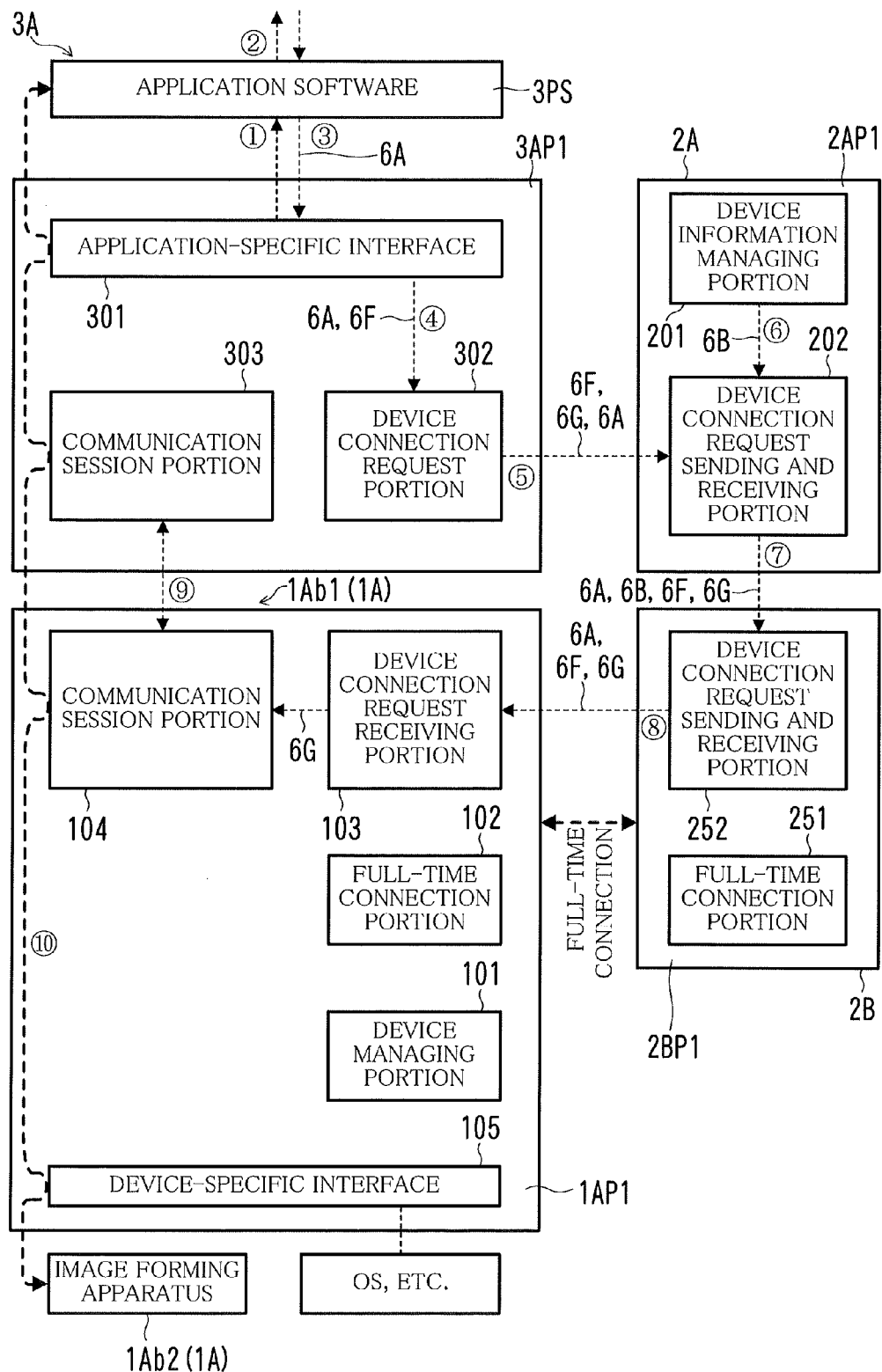
FIG. 27 is a diagram showing an example as to how information is conveyed for a case where an application server and an image forming apparatus work in coordination with each other.

FIG. 26 is a diagram showing an example of the device management table 2TL1. FIG. 27 is a diagram showing an example as to how information is conveyed for a case where the application server 3A and the image forming apparatus 1A work in coordination with each other.

In the first through fourth embodiments, the application server 3A has access to the image forming apparatus 1A having a gateway portion. The description goes on to the mechanism in which the application server 3A has access to the image forming apparatus 1A having no gateway portion by taking an example of the first embodiment.

Both the image forming apparatus 1Ab1 and the image forming apparatus 1Ab2 are located in the LAN 50*b* (see FIG. 1). The image forming apparatus 1Ab1 has a gateway portion, and the image forming apparatus 1Ab2 has no gateway portion. Accordingly, the image forming apparatus 1Ab2 performs communication with the application server 3A by using the gateway portion of the image forming apparatus 1Ab1.

As discussed earlier, the full-time connection portion 102 of the image forming apparatus 1Ab1 sends, as the device information on the image forming apparatus 1Ab1, the device identifier 6A, the account code 6B, and the device name 6C of the image forming apparatus 1Ab1 (see encircled number 5 of FIG. 7). The full-time connection portion 102 of the image forming apparatus 1Ab1 also sends, as the device information on the image forming apparatus 1Ab2, the device identifier 6A and the device name 6C of the image forming apparatus 1Ab2, and the account code 6B of the image forming apparatus 1Ab1.

The device information managing portion 201 of the device managing server 2A registers device information on each of the image forming apparatus 1Ab1 and the image forming apparatus 1Ab2 into the device management table 2TL1. As shown in FIG. 26, records having the same account code 6B are registered into the device management table 2TL1 because the gateway portion is shared by the image forming apparatus 1Ab1 and the image forming apparatus 1Ab2. The device identifier 6A may be a Media Access Control (MAC) address or an IP address.

The description goes onto the processing for a case where the application server 3Aa has access to the image forming apparatus 1Ab2 with reference to FIG. 27.

With the application server 3Aa, when the user designates the image forming apparatus 1Ab2, the device connection request portion 302 sends, to the device managing server 2A, the device identifier 6A, the address information 6F, and the device connection request 6G (encircled numbers 1-5). The device identifier 6A is a device identifier of the image forming apparatus 1Ab2, and the address information 6F is a URL for the image forming apparatus 1Ab2 to have access to the application software 3PS.

With the device managing server 2A, when receiving the device identifier 6A, the address information 6F, and the device connection request 6G, the device connection request sending and receiving portion 202 calls an account code 6B corresponding to the device identifier 6A from the device management table 2TL1 (see FIG. 26) (encircled number 6). Thereby, the account code of the image forming apparatus 1Ab1 is called as the account code 6B. The device connection request sending and receiving portion 202 then sends the device identifier 6A, the account code 6B, the address information 6F, and the device connection request 6G to the full-time connection server 2B (encircled number 7).

With the full-time connection server 2B, when receiving the device identifier 6A, the account code 6B, the address information 6F, and the device connection request 6G, the device connection request sending and receiving portion 252 finds out an image forming apparatus 1A having a gateway portion corresponding to the requested device based on the account code 6B. In this example, the image forming apparatus 1Ab1 is identified as the image forming apparatus 1A having a gateway portion.

The device connection request sending and receiving portion 252 sends the device identifier 6A, the address information 6F, and the device connection request 6G to the image forming apparatus 1A thus identified, i.e., the image forming apparatus 1Ab1, through the tunnel for the session already established (encircled number 8).

With the image forming apparatus 1Ab1, when the device connection request receiving portion 103 receives the device identifier 6A, the address information 6F, and the device connection request 6G, the communication session portion 104 has access to the application server 3A based on the address information 6F, and the communication session portion 104 and the communication session portion 303 of the application server 3A establish a session between the application server 3Aa and the image forming apparatus 1Ab1 (encircled number 9). Thereby, tunneling is completed.

If the device identifier 6A received is the device identifier 6A of the image forming apparatus 1Ab1, data is sent and received between the application software 3PS of the application server 3Aa and the operating system or the application software of the image forming apparatus 1Ab1 as discussed earlier in the first through fourth embodiments.

However, in this example, the device identifier 6A is not the device identifier 6A of the image forming apparatus 1Ab1. Therefore, the device-specific interface 105 relays communication between the application server 3Aa and the image forming apparatus 1A corresponding to the device identifier 6A, i.e., the image forming apparatus 1Ab2 (encircled number 10). Stated differently, the device-specific interface 105 transfers data sent from the application server 3Aa to the image forming apparatus 1Ab2, and vice versa.

This mechanism enables the image forming apparatus 1A to work in coordination with the application server 3A even if the image forming apparatus 1A is not provided with a gateway portion because resources are in short, or the image forming apparatus 1A is put on the market and cannot be modified.

The mechanism is also applicable to the image forming apparatuses 1A of the second through fourth embodiments.

[Second Modification to Connection with the Image Forming Apparatus 1A Having No Gateway Portion]

Figure 28:
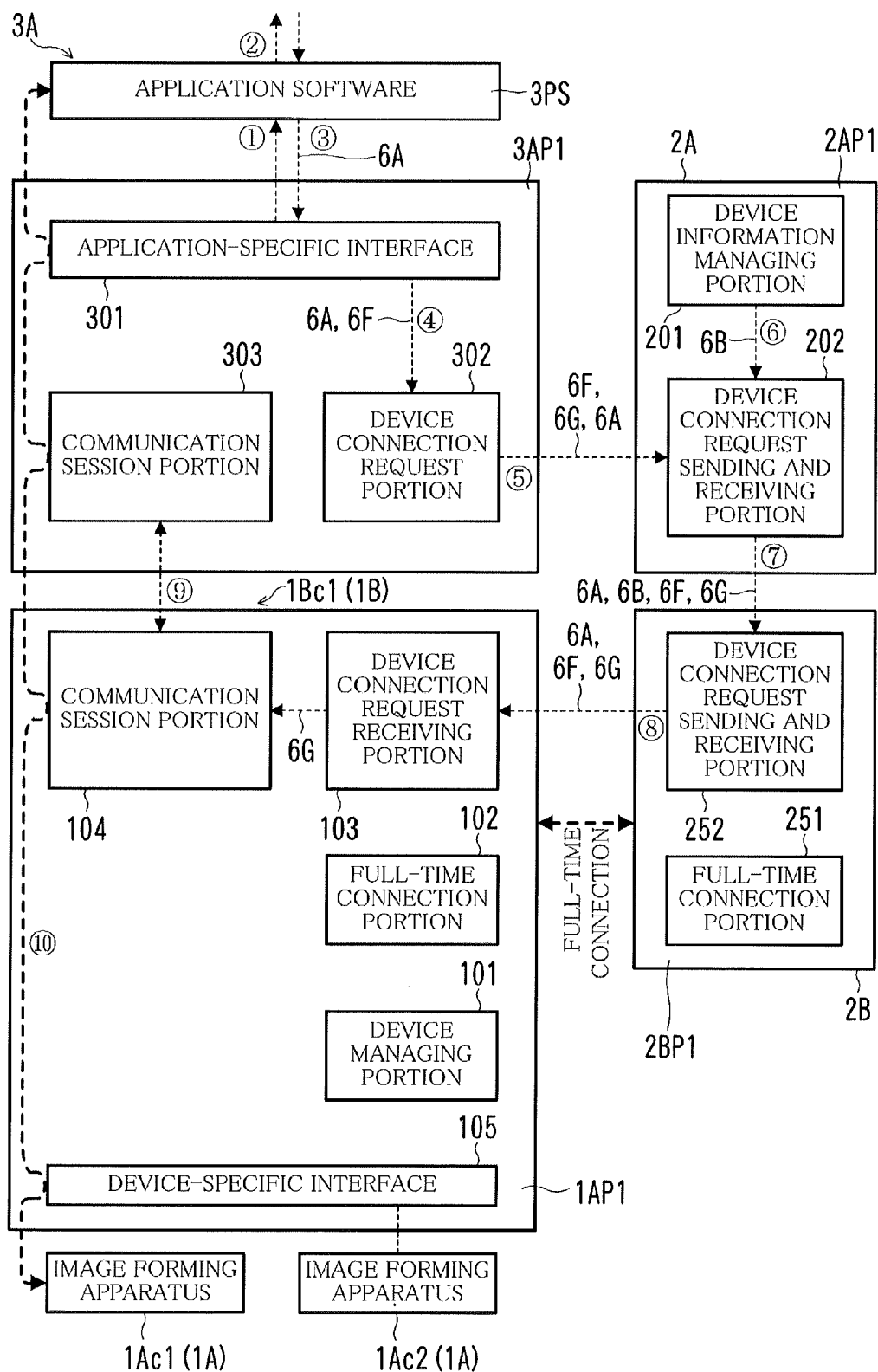
FIG. 28 is a diagram showing an example as to how information is conveyed for a case where an application server and an image forming apparatus work in coordination with each other.

FIG. 28 is a diagram showing an example as to how information is conveyed for a case where the application server 3A and the image forming apparatus 1A work in coordination with each other.

A gateway portion may be provided in a device other than the image forming apparatus 1A. In such a case, communication between the application server 3A and the image forming apparatus 1A may be performed through the gateway portion. The mechanism is described below by taking an example of the first embodiment.

All of the image forming apparatus 1Ac1, the image forming apparatus 1Ac2, and the terminal 1Bc are located in a LAN 50*c* (see FIG. 1). Neither the image forming apparatus 1Ac1 nor the image forming apparatus 1Ac2 has a gateway portion. Instead, the terminal 1Bc has a gateway portion. To be specific, the terminal 1Bc is provided with the device managing portion 101, the full-time connection portion 102, the device connection request receiving portion 103, the communication session portion 104, and the device-specific interface 105, all of which are shown in FIG. 5. Accordingly, the image forming apparatuses 1Ac1 and 1Ac2 perform communication with the application server 3A by using the gateway portion of the terminal 1Bc.

The device management table 2TL1 (see FIGS. 6 and 26) registers thereinto device information on each of the image forming apparatus 1Ac1 and the image forming apparatus 1Ac2. The account code 6B of each of the image forming apparatuses 1Ac1 and 1Ac2 is the account code of the gateway portion of the terminal 1Bc.

The procedural steps of processing for the case where the application server 3A has access to the image forming apparatus 1Ac1 or the image forming apparatus 1Ac2 are shown in FIG. 28. The procedural steps are basically the same as those of FIG. 27.

Even if there are no image forming apparatuses 1A having a gateway portion in the LAN 50, this mechanism enables the image forming apparatus 1A to work in coordination with the application server 3A.

The mechanism is also applicable to the image forming apparatuses 1A of the second through fourth embodiments. The terminal 1B may be a gateway-dedicated device, a so-called box.

In the foregoing embodiments and modifications thereof, the example is described in which the image forming apparatus 1A and the application server 3A are caused to work in coordination with each other. Instead of this, however, other devices may be used in combination with each other. For example, the present invention is also applicable to the case where the terminal 1B and the application server 3A are caused to work together, the case where the terminal 1B and the terminal 3B are caused to work in coordination, and the case where the terminal 1B and the application server 3A are caused to work in coordination.

In the foregoing embodiments and modifications thereof, the device managing server 2A and the full-time connection server 2B are used as intermediate devices provided between the application server 3A and the image forming apparatus 1A. Instead of the configuration, it is possible to use one device having the functions of the device managing server 2A and the functions of the full-time connection server 2B. Alternatively, the functions thereof may be distributed to three devices or more. Yet alternatively, the functions thereof may be implemented by a so-called cloud computer (cloud server).

In the foregoing embodiments and modifications thereof, the example is described in which the image forming apparatus 1A is caused to print a document prepared by a user. The present invention is also usable to provide other service. Examples of the service are: service of make settings of the image forming apparatus 1A remotely; service of providing an external device with a status of the image forming apparatus 1A; service of using the terminal 3B to refer to an address book stored in the image forming apparatus 1A; service of using the application server 3A to edit image data stored in the image forming apparatus 1A; and service of printing the identical document by using a plurality of the image forming apparatuses 1A. As discussed above, according to the application system 5, it is possible to perform communication via a firewall with loads put onto a relay server reduced as compared with conventional methods.

It is to be understood that the configurations of the application system 5, the image forming apparatus 1A, the device managing server 2A, the full-time connection server 2B, and the application server 3A, the constituent elements thereof, the content and order of the processing, the configuration of data, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A network system comprising:
a first device configured to perform processing;
a second device configured to cause the first device to perform the processing, the second device being an application server running an application software for the first device; and
a server configured to support the second device in having access to the first device;
the first device, the second device and the server being connected to a first communication network, wherein the first device is connected to the first communication network through a second communication network including a firewall, wherein
the first device includes a first session establishing portion configured to have access to the server and to establish a first tunnel session encapsulated in accordance with a protocol thereof between the first device and the server,
the second device includes an address information transmission portion configured to send, to the server, address information indicating an address of the second device,
the server includes a transfer portion configured to transfer the address information through the first tunnel session to the first device, and
the first device further includes a second session establishing portion configured to have access to the second device based on the address information and to establish a second tunnel session encapsulated in accordance with a protocol thereof between the first device and the second device.

2. The network system according to claim 1, wherein
the transfer portion transfers the address information if the first device stands ready to perform the processing, and
the transfer portion sends, to the second device, a message indicating that the processing cannot be performed unless the first device stands ready to perform the processing.

3. The network system according to claim 1, wherein
the first device further includes a certificate transmission portion configured to send a certificate of the first device to the second device,
the second device further includes an authentication portion configured to perform authentication of the first device based on the certificate, and
the second session establishing portion establishes the second session if the first device is successfully authenticated.

4. The network system according to claim 1, wherein
the second session establishing portion is allowed to establish a plurality of the second tunnel sessions, and
the transfer portion transfers the address information to the first device if an effective session count showing a quantity of the second tunnel sessions effective is smaller than a predetermined value.

5. The network system according to claim 1, wherein
the network system has a plurality of the first devices,
the server further includes a determination portion configured to check whether each of the plurality of first devices is in an active state which allows service to be provided, or, is in a non-active state which does not allow service to be provided,
if a designated device selected from among the plurality of first devices by a user is in the active state, the address information transmission portion sends, to the server, the address information and identification information for identifying the designated device, and the transfer portion transfers the address information to the designated device.

6. The network system according to claim 5, comprising a presenting portion configured to present, as a session effective device, one of the plurality of first devices which stands ready to execute the processing.

7. A network system comprising:
a first device configured to perform processing;
a second device configured to cause the first device to perform the processing, the second device being an application server running an application software for the first device;
a third device located in a same network as that of the first device; and
a server configured to support the second device in having access to the first device;
the first device, the second device, the third device and the server being connected to a first communication network, wherein the third device is connected to the first communication network through a second communication network including a firewall, wherein
the third device includes a first session establishing portion configured to have access to the server and to establish a first tunnel session encapsulated in accordance with a protocol thereof between the third device and the server,
the second device includes an address information transmission portion configured to send, to the server, address information indicating an address of the second device,
the server includes a transfer portion configured to transfer the address information through the first tunnel session to the third device,
the third device further includes a second session establishing portion configured to have access to the second device based on the address information and to establish a second tunnel session encapsulated in accordance with a protocol thereof between the third device and the second device, and
the third device further includes a relay portion configured to relay, through the second tunnel session, data sent and received between the first device and the second device.

8. A server for supporting a second device in having access to a first device that performs processing, the second device being an application server running an application software for the first device, the server being connectable with the first device and the second device to a first communication network, wherein the first device is connected to the first communication network through a second communication network including a firewall, the server comprising:
a session establishing portion configured to establish, when the first device has access to the server, a tunnel session encapsulated in accordance with a protocol thereof between the server and the first device; and
a transfer portion configured to transfer address information indicating an address of the second device from the second device through the tunnel session to the first device.

9. The server according to claim 8, wherein
the transfer portion transfers the address information if the first device stands ready to perform the processing, and
the transfer portion sends, to the second device, a message indicating that the processing cannot be performed unless the first device stands ready to perform the processing.

10. The server according to claim 8, wherein
the transfer portion transfers the address information to the first device if a quantity of second sessions established between the first device and a device other than the server is smaller than a predetermined value.

11. The server according to claim 8, wherein
a plurality of the first devices is provided over the first communication network,
the server further includes a determination portion configured to check whether each of the plurality of first devices is in an active state which allows service to be provided, or, is in a non-active state which does not allow service to be provided, and
if a designated device selected from among the plurality of first devices by a user is in the active state, the transfer portion transfers, to the designated device, the address information and identification information for identifying the designated device.

12. The server according to claim 11, comprising a presenting portion configured to present one of the plurality of first devices which stands ready to execute the processing.

13. A processing device for performing processing, the device comprising:
a first session establishing portion configured to have access to a server and to establish a first tunnel session encapsulated in accordance with a protocol thereof between the processing device and the server, the server supporting an external device located in a first communication network, wherein the processing device is connected to the first communication network through a second communication network including a firewall, and the external device is an application server running an application software for the processing device;
a receiving portion configured to receive address information indicating an address of the external device from the server through the first tunnel session; and
a second session establishing portion configured to have access to the external device based on the address information and to establish a second tunnel session encapsulated in accordance with a protocol thereof between the processing device and the external device.

14. A communication agent device located and used in a network together with a processing device for performing processing, the communication agent device comprising:
a first session establishing portion configured to have access to a server and to establish a first tunnel session encapsulated in accordance with a protocol thereof between the communication agent device and the server, the server supporting an external device located in a first communication network, wherein the communication agent device is connected to the first communication network through a second communication network including a firewall, and the external device is an application server running an application software for the processing device;
a receiving portion configured to receive address information indicating an address of the external device from the server through the first tunnel session;
a second session establishing portion configured to have access to the external device based on the address information and to establish a second tunnel session encapsulated in accordance with a protocol thereof between the communication agent device and the external device; and a relay portion configured to relay, through the second tunnel session, data sent and received between the processing device and the external device.

* * * * *